(12) United States Patent
Zhuang et al.

(10) Patent No.: US 11,366,856 B2
(45) Date of Patent: Jun. 21, 2022

(54) SYSTEM AND METHOD FOR UPDATING TARGET SCHEMA OF GRAPH MODEL

(71) Applicant: TigerGraph, Inc., Redwood City, CA (US)

(72) Inventors: Zixuan Zhuang, Sunnyvale, CA (US); Li Chen, Naperville, IL (US); Mingxi Wu, San Mateo, CA (US)

(73) Assignee: TIGERGRAPH, INC., Redwood City, CA (US)

( * ) Notice: Subject to any disclaimer, the term of this patent is extended or adjusted under 35 U.S.C. 154(b) by 176 days.

(21) Appl. No.: 16/092,967

(22) PCT Filed: Jun. 7, 2016

(86) PCT No.: PCT/US2016/036261
§ 371 (c)(1),
(2) Date: Oct. 11, 2018

(87) PCT Pub. No.: WO2017/189025
PCT Pub. Date: Nov. 2, 2017

(65) Prior Publication Data
US 2019/0129890 A1 May 2, 2019

Related U.S. Application Data

(60) Provisional application No. 62/327,320, filed on Apr. 25, 2016.

(51) Int. Cl.
*G06F 16/901* (2019.01)
*G06F 16/2455* (2019.01)
(Continued)

(52) U.S. Cl.
CPC ........ *G06F 16/9024* (2019.01); *G06F 16/213* (2019.01); *G06F 16/2365* (2019.01);
(Continued)

(58) Field of Classification Search
None
See application file for complete search history.

(56) References Cited

U.S. PATENT DOCUMENTS 5,592,661 A * 1/1997 Eisenberg ........... G06F 16/2365
7,933,915 B2 4/2011 Singh et al.
(Continued)

FOREIGN PATENT DOCUMENTS

WO WO 2009/149262 A1 12/2009

OTHER PUBLICATIONS

Ferrandina et al. "Implementing Lazy Database Updates for an Object Database System", Goodstep Technical Report No. 9, Mar. 21, 1994, 24 pages. (Year: 1994).*

(Continued)

*Primary Examiner* — Uyen T Le
(74) *Attorney, Agent, or Firm* — Orrick, Herrington & Sutcliffe LLP

(57) ABSTRACT

A system for updating a target schema of a graph model and methods for making and using same. A schema change job can be run to update the target schema. Loaded source data in the graph model can be updated based on the updated target schema. The schema can be changed at vertex type level, edge type level and attribute level for a pre-defined target schema after source data has been loaded. The loaded source data can be updated to be consistent with the updated target schema without a need of being reloaded. The schema change job can be defined declaratively. The target schema can be versioned and stored to maintain a history of target schema update. Advantageously, schema update can be easy to implement. The time-consuming and expensive reloading process can be avoided. Target schema updating can have high flexibility and high performance.

19 Claims, 23 Drawing Sheets

(51) Int. Cl.
  *G06F 16/2453*  (2019.01)
  *G06F 16/21*  (2019.01)
  *G06F 16/23*  (2019.01)
  *G06F 16/25*  (2019.01)

(52) U.S. Cl.
  CPC .. *G06F 16/24542* (2019.01); *G06F 16/24556* (2019.01); *G06F 16/254* (2019.01)

(56) References Cited

U.S. PATENT DOCUMENTS

| | | | |
|---|---|---|---|
| 7,979,477 | B2 | 7/2011 | McCormack et al. |
| 8,307,012 | B2 | 11/2012 | Thomas |
| 8,533,182 | B1 | 9/2013 | Charboneau |
| 8,667,027 | B2* | 3/2014 | Milousheff ............ G06F 16/282 707/802 |
| 9,430,114 | B1* | 8/2016 | Dingman ................ G06F 3/048 |
| 10,452,739 | B2* | 10/2019 | Sabino .................... G06F 16/22 |
| 11,144,520 | B2* | 10/2021 | Cooper .................. G06F 16/219 |
| 2004/0139212 | A1* | 7/2004 | Mukherjee ........... H04N 21/435 709/230 |
| 2005/0120027 | A1* | 6/2005 | Ter Horst ............ G06F 16/2428 |
| 2006/0253476 | A1 | 11/2006 | Roth et al. |
| 2009/0037769 | A1 | 2/2009 | Babkin et al. |
| 2011/0055147 | A1 | 3/2011 | Joerg et al. |
| 2012/0030220 | A1 | 2/2012 | Edwards et al. |
| 2012/0317142 | A1 | 12/2012 | Broecheler et al. |
| 2013/0326481 | A1* | 12/2013 | Kannan .................... G06F 8/71 717/123 |
| 2014/0020043 | A1* | 1/2014 | Anand .................... G06F 9/544 726/1 |
| 2014/0136520 | A1 | 5/2014 | Digana |
| 2015/0244734 | A1 | 8/2015 | Olson et al. |
| 2016/0034598 | A1 | 2/2016 | Baranov et al. |
| 2016/0055205 | A1 | 2/2016 | Jonathan et al. |
| 2016/0179850 | A1* | 6/2016 | Martin .................. G06F 16/214 707/634 |
| 2017/0091265 | A1* | 3/2017 | Cao ...................... G06F 16/2423 |
| 2017/0109392 | A1* | 4/2017 | Hamedani ............. G06F 16/213 |
| 2017/0255709 | A1* | 9/2017 | Cho .................... G06F 16/9024 |

OTHER PUBLICATIONS

Gudivada etal, "NoSQL System for Big Data Management", DOI 10.1109/SERVICES.2014.42 IEEE 2014, 8 pages.*
Preetika Tyagi, "Client-Driven Dynamic Database Updates" Arizona State University, Dec. 2011, 84 pages. (Year: 2011).*
Renzo Angles et al., "Survey of Graph Database Models", ACM Computing Surveys, vol. 40, No. 1, Article 1, Publication date: Feb. 2008, 39 pages.*
International Search Report and Written Opinion for PCT/US2016/036261, dated Jan. 25, 2017.
Ben-Ari et al., "Querying DAG-shaped Execution Traces Through Views," 12th International Workshop on the Web and Databases (WebDB 2009), Jun. 28, 2009.
Angles, Renzo, et al., "Appendix A: Survey of Graph Database Models", ACM Computing Surveys, vol. 40, No. 1, Article 1, pp. 1:1-1:39, (Feb. 2008).

* cited by examiner

SYSTEM AND METHOD FOR UPDATING TARGET SCHEMA OF GRAPH MODEL

CROSS-REFERENCE TO RELATED APPLICATIONS

This application is a national phase application from International Application No. PCT/US2016/036261, filed on Jun. 7, 2016, which claims priority to U.S. provisional patent application, Ser. No. 62/327,320, filed on Apr. 25, 2016. Priority to the preceding patent applications is expressly claimed, and the disclosures of the preceding applications are hereby incorporated herein by reference in their entireties and for all purposes.

CROSS-REFERENCE TO RELATED NONPROVISIONAL APPLICATIONS

The following Patent Cooperation Treaty (PCT) patent applications are fully owned by the assignee of the present application and are filed on the same date herewith. The disclosures of the PCT patent applications are hereby incorporated herein by reference in their entireties and for all purposes:

"SYSTEM AND METHOD FOR MANAGING GRAPH DATA," International Application No. PCT/US2016/036258, filed on Jun. 7, 2016; and "SYSTEM AND METHOD FOR QUERYING A GRAPH MODEL," International Application No. PCT/US2016/036262, filed on Jun. 7, 2016.

FIELD

The disclosed embodiments relate generally to data management and more particularly, but not exclusively, to systems and methods for managing graph data.

BACKGROUND

For several decades, the dominant model for organizing and storing data in a database has been a relational model. The relational model organizes data into one or more tables (or "relations") of columns and rows.

A more recent, but less developed, database model is a graph model. Compared with the relational model, the graph model is often faster for associative data sets and is a powerful tool for graph-like queries, such as computing the shortest path between two nodes in the graph. Other graph-like queries, such as diameter computations or community detection of a graph, can be performed over a graph database in a natural way.

However, existing systems for managing data based on a graph model need performance improvement. For example, management of graph data, such as loading data into the graph model, updating schema of the graph model, and querying the graph model can be time-consuming, require significant computation resources, lack many desired functionalities, and only provides user interface or programming language that is inconvenient for an operator to use.

In view of the foregoing, there is a need for methods and systems for managing graph data with high performance that overcome disadvantages of existing methods and systems.

SUMMARY

In accordance with a first aspect disclosed herein, there is set forth a method for updating a target schema of a graph model, including:

running a schema change job to update the target schema; and updating loaded source data in the graph model based on the updated target schema.

In some embodiments of the disclosed method, the method further includes obtaining the schema change job.

In some embodiments of the disclosed method, the obtaining includes obtaining the schema change job that specifies one or more changes for the target schema.

In some embodiments of the disclosed method, the obtaining includes obtaining the schema change job that specifies the one or more changes for the target schema including adding a new vertex type, adding a new edge type, dropping a vertex type, dropping an edge type, adding a new attribute to a vertex type, adding a new attribute to an edge type, dropping an attribute from a vertex type, dropping an attribute from an edge type, or a combination thereof.

In some embodiments of the disclosed method, the method further includes incrementing a version number of the updated target schema.

In some embodiments of the disclosed method, the running includes:

extracting a delta list from the schema change job; and
updating the target schema according to the delta list.

In some embodiments of the disclosed method, the extracting includes generating the delta list based on changes specified in the schema change job for the target schema.

In some embodiments of the disclosed method, the method further includes assigning a version number to the extracted delta list, the version number being associated with the target schema.

In some embodiments of the disclosed method, the method further includes storing the delta list associated with each respective version number and maintaining a history of the target schema based upon the stored delta list.

In some embodiments of the disclosed method, the method further includes semantically checking the delta list to avoid violating referential integrity with respect to the target schema.

In some embodiments of the disclosed method, the method further includes reporting an error upon identifying a violation of the referential integrity with respect to the target schema.

In some embodiments of the disclosed method, the schema change job specifies adding a new edge type to the target schema, and the semantically checking includes verifying whether a FROM vertex type and/or a TO vertex type for the edge type either exists in the target schema or is a new vertex type to be added to the target schema based on the delta list.

In some embodiments of the disclosed method, the schema change job specifies dropping a vertex type and/or an edge type from the target schema, and the semantically checking includes verifying whether the vertex type and/or the edge type exists in the target schema.

In some embodiments of the disclosed method, the schema change job specifies adding an attribute to a vertex type and/or an edge type, and the semantically checking includes verifying whether the vertex type and/or the edge type exists in the target schema.

In some embodiments of the disclosed method, the schema change job specifies dropping an attribute of a vertex type and/or an edge type, and the semantically checking includes verifying whether the attribute, the vertex type and/or the edge type exist in the target schema.

In some embodiments of the disclosed method, the method further includes backing up the target schema prior to the running the schema change job.

In some embodiments of the disclosed method, the updating includes updating the loaded source data by avoiding reloading source data into the graph model.

In some embodiments of the disclosed method, the schema change job specifies adding a new attribute to a vertex type and/or an edge type in the target schema, and the updating the loaded source data includes:

scanning attributes of the vertex type and/or the edge type;

re-packing the attributes including the new attribute into a predetermined binary format; and assigning a default value to the new attribute.

In some embodiments of the disclosed method, the schema change job specifies dropping an attribute of a vertex type and/or an edge type in the target schema, and the updating the loaded source data includes removing the loaded source data of the attribute.

In some embodiments of the disclosed method, the schema change job specifies dropping a vertex type and/or an edge type from the target schema, and the updating the loaded source data includes removing the loaded source data of the vertex type and/or the edge type.

In some embodiments of the disclosed method, the schema change job specifies a cascade option for dropping the edge type, and the updating the loaded source data further includes dropping a FROM vertex type and/or a TO vertex type corresponding to the edge type based on the cascade option.

In some embodiments of the disclosed method, the method further includes backing up the loaded source data prior to the updating.

In some embodiments of the disclosed method, the method further includes validating a graph query based on the updating.

In some embodiments of the disclosed method, the validating includes reporting invalidity of the graph query upon determining that the graph query is based on a vertex type and/or an edge type that is dropped via the updating.

In some embodiments of the disclosed method, the method further includes requesting an update to the graph query upon determining that the graph query is invalid based on the updating.

In some embodiments of the disclosed method, the method further includes validating a loading job based on the updating.

In some embodiments of the disclosed method, the validating includes reporting invalidity of the loading job upon determining that the loading job loads source data into an attribute that is added and/or dropped via the updating.

In some embodiments of the disclosed method, the method further includes requesting an update to the loading job upon determining that the loading job is invalid based on the updating.

In accordance with another aspect disclosed herein, there is set forth a system for updating a target schema of a graph model, including one or more processors configured for:

running a schema change job to update the target schema; and updating loaded source data in the graph model based on the updated target schema.

In some embodiments of the disclosed system, the one or more processors are configured for obtaining the schema change job.

In some embodiments of the disclosed system, the one or more processors are configured for obtaining the schema change job that specifies one or more changes for the target schema.

In some embodiments of the disclosed system, the one or more processors are configured for obtaining the schema change job that specifies the one or more changes for the target schema including adding a new vertex type, adding a new edge type, dropping a vertex type, dropping an edge type, adding a new attribute to a vertex type, adding a new attribute to an edge type, dropping an attribute from a vertex type, dropping an attribute from an edge type, or a combination thereof.

In some embodiments of the disclosed system, the one or more processors are configured for incrementing a version number of the updated target schema.

In some embodiments of the disclosed system, the one or more processors are configured for:

extracting a delta list from the schema change job; and updating the target schema according to the delta list.

In some embodiments of the disclosed system, the one or more processors are configured for generating the delta list based on changes specified in the schema change job for the target schema.

In some embodiments of the disclosed system, the one or more processors are configured for assigning a version number to the extracted delta list, the version number being associated with the target schema.

In some embodiments of the disclosed system, the one or more processors are configured for storing the delta list associated with each respective version number and maintaining a history of the target schema based upon the stored delta list.

In some embodiments of the disclosed system, the one or more processors are configured for semantically checking the delta list to avoid violating referential integrity with respect to the target schema.

In some embodiments of the disclosed system, the one or more processors are configured for reporting an error upon identifying a violation of the referential integrity with respect to the target schema.

In some embodiments of the disclosed system, the schema change job specifies adding a new edge type to the target schema, and the one or more processors are configured for verifying whether a FROM vertex type and/or a TO vertex type for the edge type either exists in the target schema or is a new vertex type to be added to the target schema based on the delta list.

In some embodiments of the disclosed system, the schema change job specifies dropping a vertex type and/or an edge type from the target schema, and the one or more processors are configured for verifying whether the vertex type and/or the edge type exists in the target schema.

In some embodiments of the disclosed system, the schema change job specifies adding an attribute to a vertex type and/or an edge type, and the one or more processors are configured for verifying whether the vertex type and/or the edge type exists in the target schema.

In some embodiments of the disclosed system, the schema change job specifies dropping an attribute of a vertex type and/or an edge type, and the one or more processors are configured for verifying whether the attribute, the vertex type and/or the edge type exist in the target schema.

In some embodiments of the disclosed system, the one or more processors are configured for backing up the target schema prior to the running the schema change job.

In some embodiments of the disclosed system, the one or more processors are configured for updating the loaded source data by avoiding reloading source data into the graph model.

In some embodiments of the disclosed system, the schema change job specifies adding a new attribute to a vertex type and/or an edge type in the target schema, and the one or more processors are configured for:

scanning attributes of the vertex type and/or the edge type;

re-packing the attributes including the new attribute into a predetermined binary format; and assigning a default value to the new attribute.

In some embodiments of the disclosed system, the schema change job specifies dropping an attribute of a vertex type and/or an edge type in the target schema, and the one or more processors are configured for removing the loaded source data of the attribute.

In some embodiments of the disclosed system, the schema change job specifies dropping a vertex type and/or an edge type from the target schema, and the one or more processors are configured for removing the loaded source data of the vertex type and/or the edge type.

In some embodiments of the disclosed system, the schema change job specifies a cascade option for dropping the edge type, and the one or more processors are configured for dropping a FROM vertex type and/or a TO vertex type corresponding to the edge type based on the cascade option.

In some embodiments of the disclosed system, the one or more processors are configured for backing up the loaded source data prior to the updating.

In some embodiments of the disclosed system, the one or more processors are configured for validating a graph query based on the updating.

In some embodiments of the disclosed system, the one or more processors are configured for reporting invalidity of the graph query upon determining that the graph query is based on a vertex type and/or an edge type that is dropped via the updating.

In some embodiments of the disclosed system, the one or more processors are configured for requesting an update to the graph query upon determining that the graph query is invalid based on the updating.

In some embodiments of the disclosed system, the one or more processors are configured for validating a loading job based on the updating.

In some embodiments of the disclosed system, the one or more processors are configured for reporting invalidity of the loading job upon determining that the loading job loads source data into an attribute that is added and/or dropped via the updating.

In some embodiments of the disclosed system, the one or more processors are configured for requesting an update to the loading job upon determining that the loading job is invalid based on the updating.

In accordance with another aspect disclosed herein, there is set forth a computer program product for updating a target schema of a graph model, including:

instruction for running a schema change job to update the target schema; and instruction for updating loaded source data in the graph model based on the updated target schema.

In one embodiment, the computer program product optionally can be encoded on one or more machine-readable storage media.

In some embodiments of the disclosed computer program product, the computer program product further includes instruction for obtaining the schema change job.

In some embodiments of the disclosed computer program product, the computer program product further includes instruction for obtaining the schema change job that specifies one or more changes for the target schema.

In some embodiments of the disclosed computer program product, the computer program product further includes instruction for obtaining the schema change job that specifies the one or more changes for the target schema including adding a new vertex type, adding a new edge type, dropping a vertex type, dropping an edge type, adding a new attribute to a vertex type, adding a new attribute to an edge type, dropping an attribute from a vertex type, dropping an attribute from an edge type, or a combination thereof.

In some embodiments of the disclosed computer program product, the computer program product further includes instruction for incrementing a version number of the updated target schema.

In some embodiments of the disclosed computer program product, the computer program product further includes instruction for:

extracting a delta list from the schema change job; and updating the target schema according to the delta list.

In some embodiments of the disclosed computer program product, the computer program product further includes instruction for generating the delta list based on changes specified in the schema change job for the target schema.

In some embodiments of the disclosed system, the computer program product further includes instruction for assigning a version number to the extracted delta list, the version number being associated with the target schema.

In some embodiments of the disclosed computer program product, the computer program product further includes instruction for storing the delta list associated with each respective version number and maintaining a history of the target schema based upon the stored delta list.

In some embodiments of the disclosed computer program product, the computer program product further includes instruction for semantically checking the delta list to avoid violating referential integrity with respect to the target schema.

In some embodiments of the disclosed computer program product, the computer program product further includes instruction for reporting an error upon identifying a violation of the referential integrity with respect to the target schema.

In some embodiments of the disclosed computer program product, the schema change job specifies adding a new edge type to the target schema, and the computer program product further includes instruction for verifying whether a FROM vertex type and/or a TO vertex type for the edge type either exists in the target schema or is a new vertex type to be added to the target schema based on the delta list.

In some embodiments of the disclosed computer program product, the schema change job specifies dropping a vertex type and/or an edge type from the target schema, and the computer program product further includes instruction for verifying whether the vertex type and/or the edge type exists in the target schema.

In some embodiments of the disclosed computer program product, the schema change job specifies adding an attribute to a vertex type and/or an edge type, and the computer program product further includes instruction for verifying whether the vertex type and/or the edge type exists in the target schema.

In some embodiments of the disclosed computer program product, the schema change job specifies dropping an attribute of a vertex type and/or an edge type, and the computer program product further includes instruction for verifying whether the attribute, the vertex type and/or the edge type exist in the target schema.

In some embodiments of the disclosed computer program product, the computer program product further includes instruction for backing up the target schema prior to the running the schema change job.

In some embodiments of the disclosed computer program product, the computer program product includes instruction for updating the loaded source data by avoiding reloading source data into the graph model.

In some embodiments of the disclosed computer program product, the schema change job specifies adding a new attribute to a vertex type and/or an edge type in the target schema, and the computer program product further includes instruction for:

scanning attributes of the vertex type and/or the edge type;

re-packing the attributes including the new attribute into a predetermined binary format; and assigning a default value to the new attribute.

In some embodiments of the disclosed computer program product, the schema change job specifies dropping an attribute of a vertex type and/or an edge type in the target schema, and the computer program product further includes instruction for removing the loaded source data of the attribute.

In some embodiments of the disclosed computer program product, the schema change job specifies dropping a vertex type and/or an edge type from the target schema, and the computer program product further includes instruction for removing the loaded source data of the vertex type and/or the edge type.

In some embodiments of the disclosed computer program product, the schema change job specifies a cascade option for dropping the edge type, and the computer program product further includes instruction for dropping a FROM vertex type and/or a TO vertex type corresponding to the edge type based on the cascade option.

In some embodiments of the disclosed computer program product, the computer program product further includes instruction for backing up the loaded source data prior to the updating.

In some embodiments of the disclosed computer program product, the computer program product further includes instruction for validating a graph query based on the updating.

In some embodiments of the disclosed computer program product, the computer program product further includes instruction for reporting invalidity of the graph query upon determining that the graph query is based on a vertex type and/or an edge type that is dropped via the updating.

In some embodiments of the disclosed computer program product, the computer program product further includes instruction for requesting an update to the graph query upon determining that the graph query is invalid based on the updating.

In some embodiments of the disclosed computer program product, the computer program product further includes instruction for validating a loading job based on the updating.

In some embodiments of the disclosed computer program product, the computer program product further includes instruction for reporting invalidity of the loading job upon determining that the loading job loads source data into an attribute that is added and/or dropped via the updating.

In some embodiments of the disclosed computer program product, the computer program product further includes instruction for requesting an update to the loading job upon determining that the loading job is invalid based on the updating.

Figure 1:
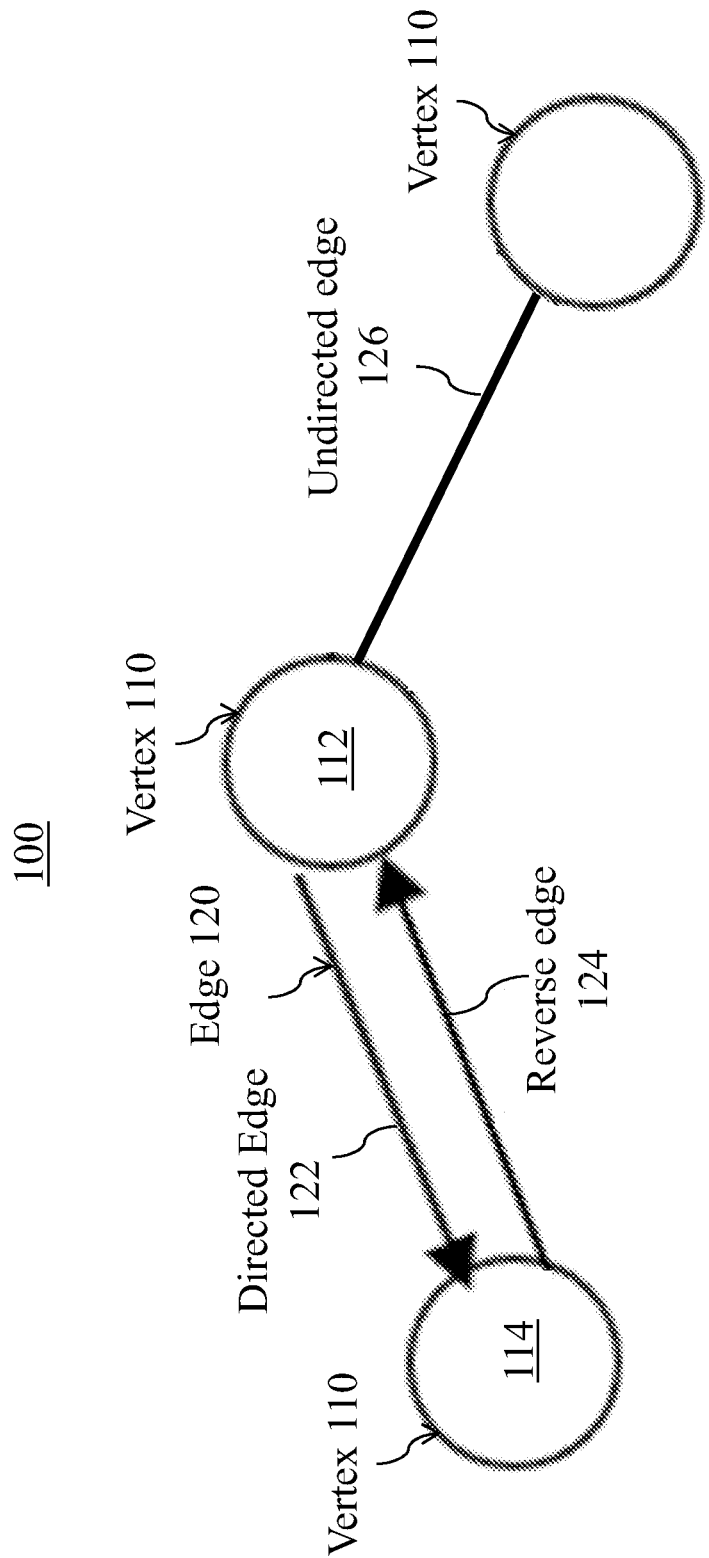
FIG. 1 is an exemplary diagram illustrating an embodiment of a graph model.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available methods and systems are incapable of managing graph data with high performance, a graph data management system and method that optimizes performance in various aspects of graph data management can prove desirable and provide a basis for a wide range of database applications, such as database systems for banking, transportation, commerce, education, human resources, talent management, and/or social network.

Turning to FIG. 1, an exemplary graph model 100 is shown. The graph model 100 can include one or more vertices 110 and/or one or more edges 120. A vertex 110 can have one or more attributes. The value of each attribute can identify and/or characterize the vertex 110. For each attribute, the value can be uniform and/or different among the vertices 110.

An exemplary attribute can include a primary identification (ID) to uniquely identify the vertex 110. Stated somewhat differently, values of the attribute primary ID of vertices 110 can identify the vertices 110, respectively. An edge 120 can represent a relation between a pair of vertices 110. The edge 120 can be directed and/or undirected. As shown in FIG. 1, a directed edge 122 can indicate a direction between a pair of vertices 110, starting from a from_vertex 112 and ending at a to_vertex 114. For example, the directed edge 122 can be described by "(from_vertex 112, to_vertex 114)."

A reverse edge 124 of the edge 120 can start from the to_vertex 114 and end at the from_vertex 112. An undirected edge 126 can indicate a relation between the pair of vertices 110, without necessarily distinguishing the vertex 110 for starting and/or ending the undirected edge 126.

A vertex type can include a data category to which one or more vertices 110 belong. If one or more selected vertices 110 each represent data of a person, for example, the selected vertices 110 can belong to a person vertex type. An attribute of the vertex type can include the attribute of each vertex 110 of the vertex type.

An edge type can describe a data category to which one or more edges 120 belong. If one or more selected edges 120 each represent data of person (that is, a vertex 110 representing person) recommending movie (that is, a vertex 110 representing movie), for example, the selected edges 120 can belong to a recommendation edge type. An attribute of the edge type can include the attribute of each edge 120 of the edge type.

The graph model 100 can include vertices 110 associated with one or more vertex types and edges 120 associated with one or more edge types. For example, the graph model 100 representing person recommending movie can be created based on a person vertex type, a movie vertex type, and/or a recommendation edge type connecting from the person vertex type to the movie vertex type.

Figure 2:
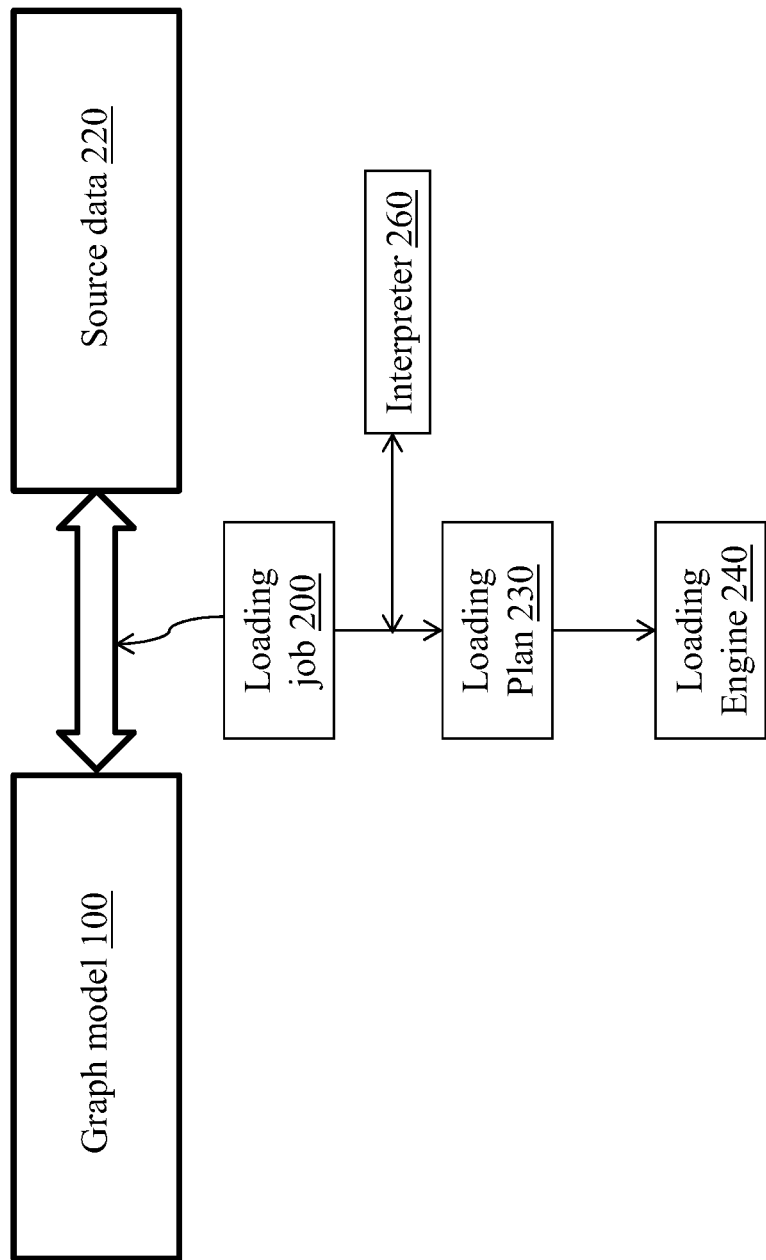
FIG. 2 is an exemplary top-level block diagram illustrating an embodiment of a loading job for loading source data into the graph model of FIG. 1.

Turning to FIG. 2, in order to load data into the graph model 100 (shown in FIG. 1), a loading job 200 can specify mappings from source data 220 to the graph model 100. The source data 220 and the graph model 100 can have a source schema and a target schema, respectively. A schema can include a framework for organizing data. In an illustrative example, the source data 220 can include data organized in a table including rows or columns UserName, UserAge, and UserSalary. The source schema can be expressed as "Source (UserName, UserAge, UserSalary)."

The target schema can specify vertex type(s), edge type(s) and/or attributes thereof, the graph model 100 includes. In an illustrative example, the graph model 100 can include a vertex type or an edge type named "Target" and having attributes "Age" and "Name". The target schema can be expressed as "Target(Age, Name)."

Exemplary source data 220 can be in a fixed tabular row (or line) format. An exemplary format can include ".csv" format. For example, a mapping can be created from the source column "UserName" to the attribute "Name," and another mapping can be created from the source column "UserAge" to the attribute "Age." The source column UserSalary can be unused in mapping the source data 220 to the graph model 100.

The loading job 200 can be defined by an operator for managing graph data. Based on the loading job 200, a loading plan 230 can be generated. As shown in FIG. 2, an interpreter 260 can receive (and/or interface with) the loading job 200 to generate a loading plan 230 based on the loading job 200. For example, the interpreter 260 can include a computer program configured to receive the loading job 200. One loading plan 230 can correspond to one loading job 200.

The loading plan 230 can include information extracted from the loading job 200 into a data structure that a loading engine 240 can interpret. In one embodiment, the interpreter 260 can pass the loading plan 230 to the loading engine 240.

The loading engine 240 can include coded instructions for loading the source data 220 into the graph model 100 according to the mapping therebetween. The loading engine 240 can obtain the mapping based on the loading plan 230. The loading plan 230 can thus guide the loading engine 240 in loading the source data 220 into the graph model 100.

Figure 3:
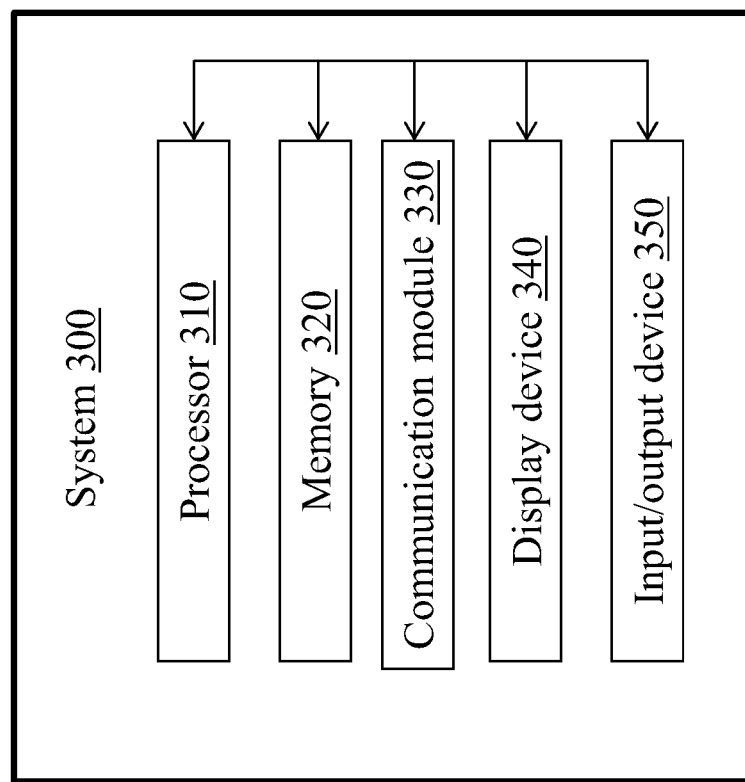
FIG. 3 is an exemplary top-level diagram illustrating an embodiment of a system for managing graph data for loading data based on the loading job of FIG. 2.

Turning to FIG. 3, a system 300 for managing graph data is shown. The system 300 can include a processor 310. The processor 310 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

As shown in FIG. 3, the system 300 can include one or more additional hardware components as desired. Exemplary additional hardware components include, but are not limited to, a memory 320 (alternatively referred to herein as a non-transitory computer readable medium). Exemplary memory 320 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the system 300 can be stored on the memory 320 to be executed by the processor 310.

Additionally and/or alternatively, the system 300 can include a communication module 330. The communication module 330 can include any conventional hardware and software that operates to exchange data and/or instruction between the system 300 and another computer system (not shown) using any wired and/or wireless communication methods. For example, the system 300 can receive the source data 220 (shown in FIG. 2) from another computer system via the communication module 330. Exemplary communication methods include, for example, radio, Wireless Fidelity (Wi-Fi), cellular, satellite, broadcasting, or a combination thereof.

Additionally and/or alternatively, the system 300 can include a display device 340. The display device 340 can include any device that operates to presenting programming instructions for operating the system 300, and/or presenting data in the graph model 100. Additionally and/or alternatively, the system 300 can include one or more input/output devices 350 (for example, buttons, a keyboard, keypad, trackball), as desired.

The processor 310, the memory 320, the communication module 330, the display device 340, and/or the input/output device 350 can be configured to communicate, for example, using hardware connectors and buses and/or in a wireless manner.

Figure 4:
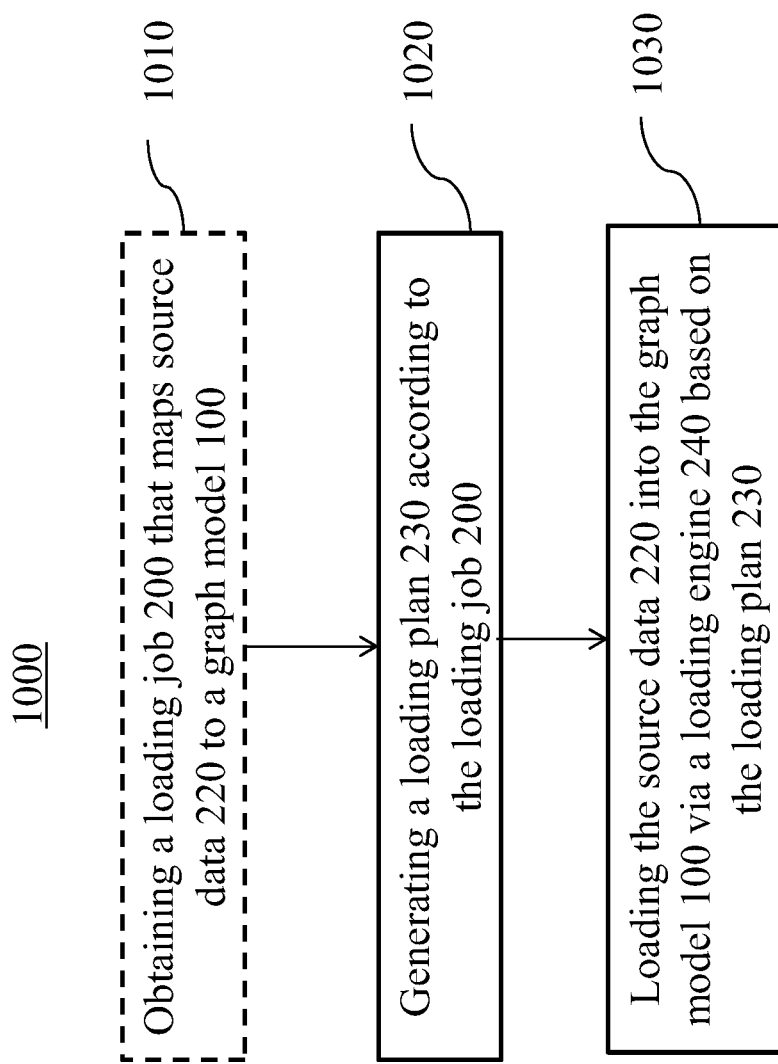
FIG. 4 is an exemplary top-level flow chart illustrating an embodiment of a method for loading data based on the loading job of FIG. 2.

Turning to FIG. 4, an exemplary method 1000 for managing graph data is shown. The method 1000, for example, can be implemented by the system 300 (shown in FIG. 3). In FIG. 4, optionally, the loading job 200 that maps the source data 220 to the graph model 100 is obtained, at 1010.

The loading job 200 can be defined by an operator in any predetermined manner. For example, the loading job 200 can be defined by the operator via a user interface (not shown) provided by the system 300. The user interface can include graphical user interface, and/or a declarative language have predetermined syntax known to the operator.

The loading job 200 can be based on the target schema of the graph model 100. The target schema can include vertex types, edge types, and/or attributes thereof. Table 1 shows creation of an exemplary target schema.

TABLE 1

| Line | Instruction |
| --- | --- |
| 1 | create vertex person (primary_id name string, id string) |
| 2 | create vertex movie (primary_id id uint, title string) |
| 3 | create directed edge roles (from person, to movie, role string) |
| 4 | create graph Demo (person, movie, roles) |

As shown in Table 1, the target schema can be defined using a CREATE clause in the declarative language. The target schema can be define via one or more statements each defining a vertex type or an edge type via the CREATE clause.

Table 2 shows exemplary top-level syntax of the declarative language for creating the loading job 200.

TABLE 2

| Line | Instruction |
| --- | --- |
| 1 | CREATE LOADING JOB jobname FOR GRAPH graphname |
| 2 | LOAD "filePath" TO VERTEX vertexname VALUES ($x, |
| 3 | token1UDF($x),...tokenMUDF($x,$y,token1UDF($z))...$x) USING |
| 4 | HEADER="true", SEPARATOR=",", QUOTE="single"; |
| 5 | LOAD "filePath" TO EDGE edgename VALUES ($"colName", "abc", 2, |
| 6 | NULL,...$x) USING HEADER="true", SEPARATOR=","; |
| 7 | LOAD "filePath" |
| 8 | TO VERTEX vetexname VALUES ($x,...$x) [WHERE |
| 9 | conditionFunc($x,..., $x) or disjunction], |
| 10 | TO VERTEX vetexname2 VALUES ($x,...$x) [WHERE |
| 11 | conditionFunc($x,...,$x) or disjunction], |
| 12 | TO EDGE edgename VALUES ($x, $x,...$x) [WHERE |
| 13 | conditionFunc($x,...$x) or disjunction] |
| 14 | USING HEADER="true", SEPARATOR=",", QUOTE="DOUBLE"; |
| 15 | END |

Line 2 of Table 2 specifies source data 220 as "filepath." Exemplary source of source data 220 can include a source file and/or an online data stream. Additionally and/or alternatively, the "filePath" can be a Uniform Resource Identifier (URI) of a file source or a keyword for online Hypertext Transfer Protocol (HTTP) post request.

To map the source data 220 to the graph model 100, the source data 220 can be processed as one or more tokens. For example, the source file can include a token stream. Stated somewhat differently, each row in the source file can include a list of tokens. Each column of a row can include one token. The exemplary syntax can use the "$" prefix to indicate a token from the source file. The tokens in one row can be determined by one or more separators used in the source file. For instance, if the source file is comma-separated values (CSV) file, the separator can include a comma. If the source file is tab-separated values (TSV) file, the separator can include a tab.

In some embodiments, the tokens can be referenced by position. For example, the loading job 200 can use $0, $1 . . . to represent the columns from the source file. In an exemplary source file, the source schema can be Source (UserName, UserAge, UserSalary), UserName can be referred to as $0, UserAge can be referred to as $1, and UserSalary can be referred to as $2. So for the target schema Target(Age, Name) of the graph model 100, the loading job 200 can specify the mapping as ($1, $0), to indicate that the second column of the source file maps to a first attribute of "Target" and that the first column of the source file maps to a second attribute of "Target."

In some embodiments, the tokens can be referenced by name. For example, the loading job 200 can use $"columnName" to represent the column from the source file. In the immediately-preceding example, the UserName column can be referred to as $"UserName" and the UserAge column can be referred to as $"UserAge." The mapping can be represented as ($"UserAge", $"UserName") to indicate that the second column of the source file maps to the first attribute of "Target" and the first column of the source file maps to the second attribute of "Target."

In Table 2, the loading job 200 can define a loading job by one or more loading statements, each specifying a mapping from the source data 220 to the graph model 100 by the VALUES clause. The VALUES clause can allow the loading job 200 to specify source file columns.

Additionally and/or alternatively, the loading job 200 can include string and/or numerical literals in the place of "$x."

The loading job 200 can include a place holder "_" in the place of "$x" to indicate the loading job 200 does not need to fill in a value for the attribute. The system 300 can use a default value from the target schema. For example, the value can be stored in the memory 320 (shown in FIG. 3).

The syntax shown in Table 2 can support loading one source file to one vertex or edge type and/or loading one source file to multiple vertex and edge types.

The USING clause can include a list of key-value pairs, which can extend functions of the system 300 to deal with certain unforeseeable heterogeneity. The USING clause of a loading statement can let the loading job 200 specify a token separator, a header, and any other suitable properties about the loading statement.

Table 3 shows an exemplary loading job 200 based on the target schema defined in Table 1.

TABLE 3

| Line | Instruction |
| --- | --- |
| 1 | create loading job initJob for graph Demo { |
| 2 | load "./p1.csv" to vertex person values ($"name",$"id") |
| 3 | using header="true", separator=",", quote="double"; |
| 4 | load "./m1.csv" to vertex movie values ($"id", |
| 5 | gsql_concat("movie_",gsql_concat("2015_", gsql_concat |
| 6 | ("usa_", $"title")))) |
| 7 | using header="true", separator=","; |
| 8 | load "./r1.csv" to edge roles values ($"personId", $"movieId", |
| 9 | $"role") |
|  | using header="true", separator=","; |
|  | } |

In lines 2, 4 and 7 of Table 3, "./p1.csv" "./m1.csv" and "./r1.csv" are source files containing the source data 220, respectively. Tokens in each of the source files are mapped to the vertex types and edge types defined in Table 1. In Table 3, the loading job 200 refers to tokens by name, that is, $"columnName".

In addition to allowing user to specify the loading job 200, there are other session parameters offered to allow an operator to set report format and/or set source data root path. For example, the session parameters can have the following syntax:

SET sessionParameter=xxx.

For example, the syntax can be used in the command:
SET sys.data_root="/data/test/".

User can use $sys.data_root in their loading script as a reference point, for example:
load "$sys.data_root/movie.csv" to vertex movie . . . .

Additionally and/or alternatively, the interpreter 260 (shown in FIG. 2) can interactively provide semantic check on script of the loading job 200, such as checking the existence of the vertex type and edge type, checking total number of elements in the VALUES clause against the target schema, etc. The interactive interpreter can detect error interactively such that the operator can get hints and fix the error before loading data.

Returning to FIG. 4, the loading plan 230 is generated, at 1020, according to the loading job 200. For example, when the interpreter 260 detects no problem in the loading job 200, the interpreter 260 can generate the loading plan 230 as a file. The source data 220 are loaded, at 1030, into the graph model 100 according the loading plan 230. The loading engine 240 (shown in FIG. 2), for example, can load the source data 220.

Figure 5:
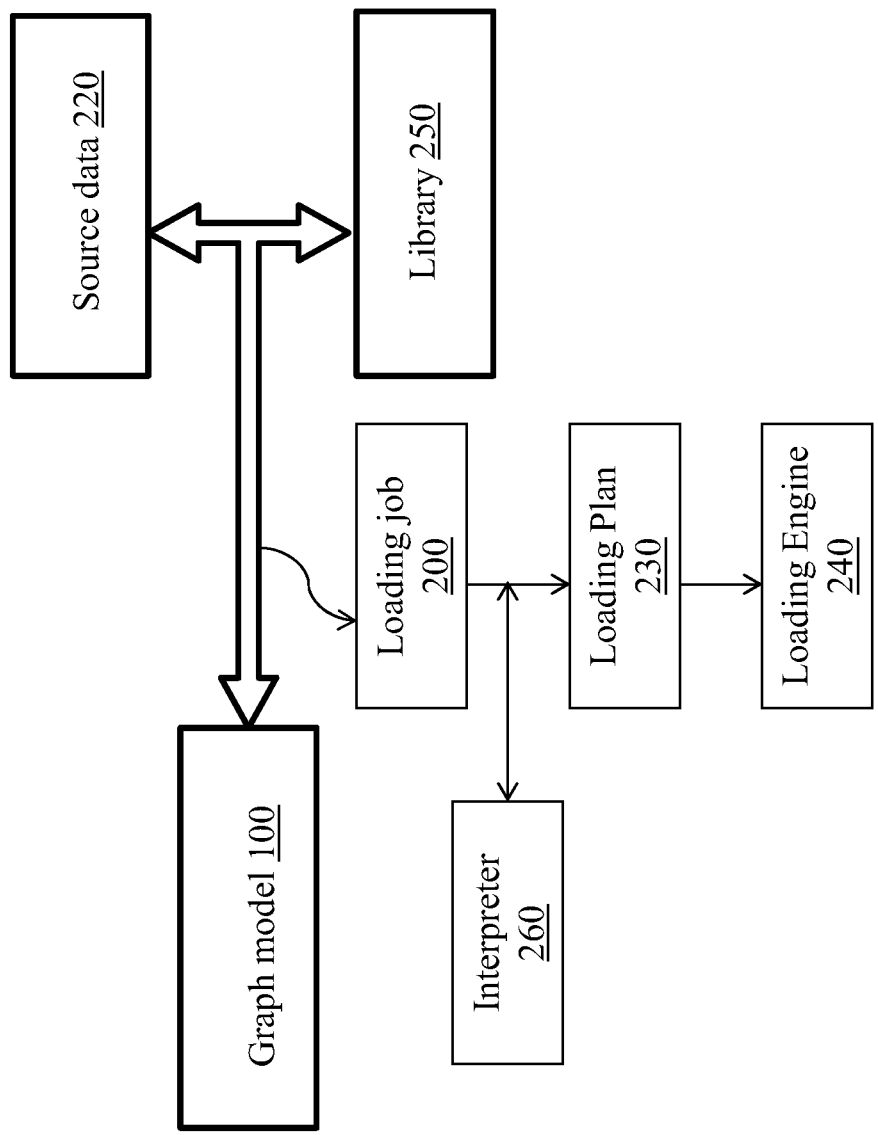
FIG. 5 is an exemplary block diagram illustrating an alternative embodiment of the loading job of FIG. 2, wherein the loading job applies a transformation function from a library to source data.

Turning to FIG. 5, the loading job 200 can relate a library 250 with the graph model 100. In some embodiments, the source data 220 is not necessarily in a final form to be loaded into the graph model 100. For example, a token transformation can be encoded by a function f (token)→resultant token, where the function receives a token as an input and outputs a resultant token before loading the resultant token to the graph model 100. For instance, a token function f("2000/10/01") can yield "2000" where the token function f( ) transforms a timestamp token to a year-only representation token. In some examples, a chain of token transformations can be needed to transform an input token to a resultant token. For instance, g(f("2000/10/01")) can yield "leap_year" where f( ) transform the input to "2000" and g( ) transform the year to "leap_year" or "non_leap_year" depending on whether the year is leap year.

The loading job 200 can specify a function for transforming a token before the source data 220 is loaded. The library 250 can include one or more user-defined token transformation functions (UDFs) for use by the loading job 200. For example, the library 250 can be stored on the memory 320 (shown in FIG. 3).

The UDFs can be nested. In other words, the VALUES function in the loading job 200 can allow arbitrarily-nested UDFs to transform tokens. For example, line 5 of Table 3 includes a chain of token transformations using an exemplary UDF "gsql_concat" to transform the token referenced by "$title". The UDF "gsql_concat" can be pre-defined in the library 250.

The UDFs in the library 250 can be predefined and ready to use for the operator. Additionally and/or alternatively, the UDFs can be custom-defined by an operator using a certain programming language and/or an application programming interface (API). In other words, the UDFs can be obtained via the programming language and/or the application programming interface (API). The UDFs can be stored in the library 250. An exemplary programming language can include C, C++, Java, or a combination thereof. The UDFs and/or the library 250 can be compiled into native code (or machine code) of the system 300 (shown in FIG. 3) and ready to be called by the loading engine 240 during data loading.

In some embodiments, to facilitate dynamic data loading, the UDFs can include a set of fixed signature functions, so the signature functions can be called by the loading job 200 at runtime. Respective names of the signature functions can be chosen at will by the operator. Depending on type of data returned by the signature function, exemplary signature functions can include string[ ]→string, which can include a class of functions that can receive a set of input tokens and transform the input tokens into a token of string type. Such a signature function can have be as follows:

extem "C" void funcName (const char const iToken [ ], uint32_t iTokenLen [ ], uint32_t iTokenNum, char const oToken, uint32_t& oTokenLen).

Table 4 shows exemplary explanation of the parameter of the signature function.

TABLE 4

| Parameter | function |
| --- | --- |
| iToken | 1 or M input tokens, each pointed by one char pointer |
| iTokenLen | Length of each input token |
| iTokenNum | how many input tokens |
| oToken: | the output token buffer; caller will prepare this buffer. |
| oTokenLen: | the output token length |

Additionally and/or alternatively, exemplary signature functions can include string[ ]→int/bool/float, which can include a class of functions that can receive a set of input tokens and transform the input tokens to a token of integer (or "int"), Boolean (or "bool") or floating point (or "float") type. Such a signature function can be as follows:

extem "C" uint64_t funcName (const char const iToken [ ], uint32_t iTokenLen [ ], uint32_t iTokenNum)

extem "C" bool funcName (const char const iToken [ ], uint32_t iTokenLen [ ], uint32_t iTokenNum)

extem "C" float funcName (const char const iToken [ ], uint32_t iTokenLen [ ], uint32_t iTokenNum)

Table 5 shows exemplary explanation of the parameter of the functions.

TABLE 5

| Parameter | function |
|---|---|
| iToken | 1 or M input tokens, each pointed by one char pointer |
| iTokenLen | Length of each input token |
| iTokenNum | how many input tokens |
| return: | the function returns uint64_t, bool or float value. |

With the signature token functions, the operator can define any token transformation function, and the loading engine 240 can be configured to invoke the token transformation function.

For example, Table 6 shows exemplary code of gsql_concat, an exemplary UDF that can concatenate a list of input tokens into one big output token.

TABLE 6

| Line | Instruction |
|---|---|
| 1 | /* this function concatenate all input tokens into one big token*/ |
| 2 | extern "C" void gsgl_concat ( |
| 3 | const char* const iToken [ ], |
| 4 | uint32_t iTokenLen [ ], |
| 5 | uint32_t iTokenNum, |
| 6 | char* const oToken, |
| 7 | uint32_t& oTokenLen){ |
| 8 | int k = 0; |
| 9 | for ( int i =0; i < iTokenNum; i++){ |
| 10 | for ( int j =0; j < iTokenLen [i]; j++) { |
| 11 | oToken [ k++1=iToken [i] [j]; |
| 12 | } } |
| 13 | oTokenLen = k; |
| 14 | } |

Additionally and/or alternatively, as previously shown in Table 2, a WHERE clause can host a token function for validating and/or filtering one or more lines of the source data 220. An exemplary WHERE clause can support disjunctions using tokens, for example, WHERE $"person_name"="Mike" or toInt($"year")>2000. The line can be validated first before the loading engine 240 allows the line from the source data 220 to enter a loading process. Some lines can be rejected and some lines can pass the evaluation. Additionally and/or alternatively, validated lines can be filtered via one or more WHERE clauses to be selectively loaded from the source data 220 and into the graph model 100.

In some embodiments, the loading job 200 can have the operator to specify the token function as a Boolean condition using the declarative language. In the loading job 200 defined using the declarative language, the operator can specify Boolean condition by AND and/or OR rules. Table 7 shows an exemplary loading job 200.

TABLE 7

| Line | Instruction |
|---|---|
| 1 | load "./p1.csv" to vertex person values ($"name",$" id ") |
| 2 | where to_int ($"id ") >3 AND $"name" == "ABC" OR |
| 3 | to_int ($"id ") < 3 AND $"name" == "EFG" |
| 4 | using header- "true ", separator - " , ", quote-"double " |

As shown in Table 7, if token $"id" is greater than three and token $"name" is identical to "ABC," or, token $"id" is less than three and token $"name" is identical to "EFG," the operator can return a value "true." Thus, the loading job 200 can include a loading statement that applies a filter to the source data 220 to filter unwanted rows from the source data 220.

The WHERE clause can thus be close to natural language that can be easy for a human to understand, and thus can greatly improve readability of script of the loading job 200.

The system 300 can translate the Boolean condition into a Boolean token function to serve as a filtering and/or validation rule. For example, an exemplary Boolean token function for receiving a set of tokens and returning a Boolean value can be:

extem "C" bool funcName (const char const iToken [ ], uint32_t iTokenLen [ ], uint32_t iTokenNum)

For example, the interpreter 260 can advantageously translate the WHERE clause to the Boolean token function so that the loading engine 240 can invoke the Boolean token function on each line to do filtering. For example, the interpreter can translate a Boolean rule to the Boolean token function via expression level code generation. The WHERE clause in Table 7 can be translated into an exemplary Boolean token function shown in Table 8.

TABLE 8

| Line | Instruction |
|---|---|
| 1 | extern "C" bool load1_condition (const char const iToken [ ], |
| 2 | uint32_t iTokenLen [ ],uint32_t iTokenNum) { |
| 3 | int rd1 - strcmp ( iToken [1], "ABC"); |
| 4 | int rc2 - strcmp ( iToken [1], "EFG"); |
| 5 | if ( atoi ( iToken [0], iTokenLen [0]) > 3 && |
| 6 | rc1 == 0 \|\| |
| 7 | atoi ( iToken [0], iTokenLen [0]) < 3 && |
| 8 | rc2 ==0) { |
| 9 | return true; |
| 10 | } else { |
| 11 | return false; |
| 12 | } |
| 13 | } |

Thus, the operator can declaratively specify arbitrary condition functions on the source data 220, and the condition functions can be translated into Boolean token functions.

The disclosed system 300 can thus permit token transformation during loading of the source data 220. Advantageously, the source data 220 can be aggregated and/or reduced when being loaded. Without the disclosed system 300, a loader may need to perform a one-to-one mapping of tokens in source data to data fields in the graph model, and transformation may not be permitted. Even if such transformation may be permitted subsequently after loading the source data, the loading can be very inefficient, because if the source data size is very large (e.g., terabytes, petabytes, or exabytes), loading all the source data first and reducing the source data next can be impractical.

Figure 6:
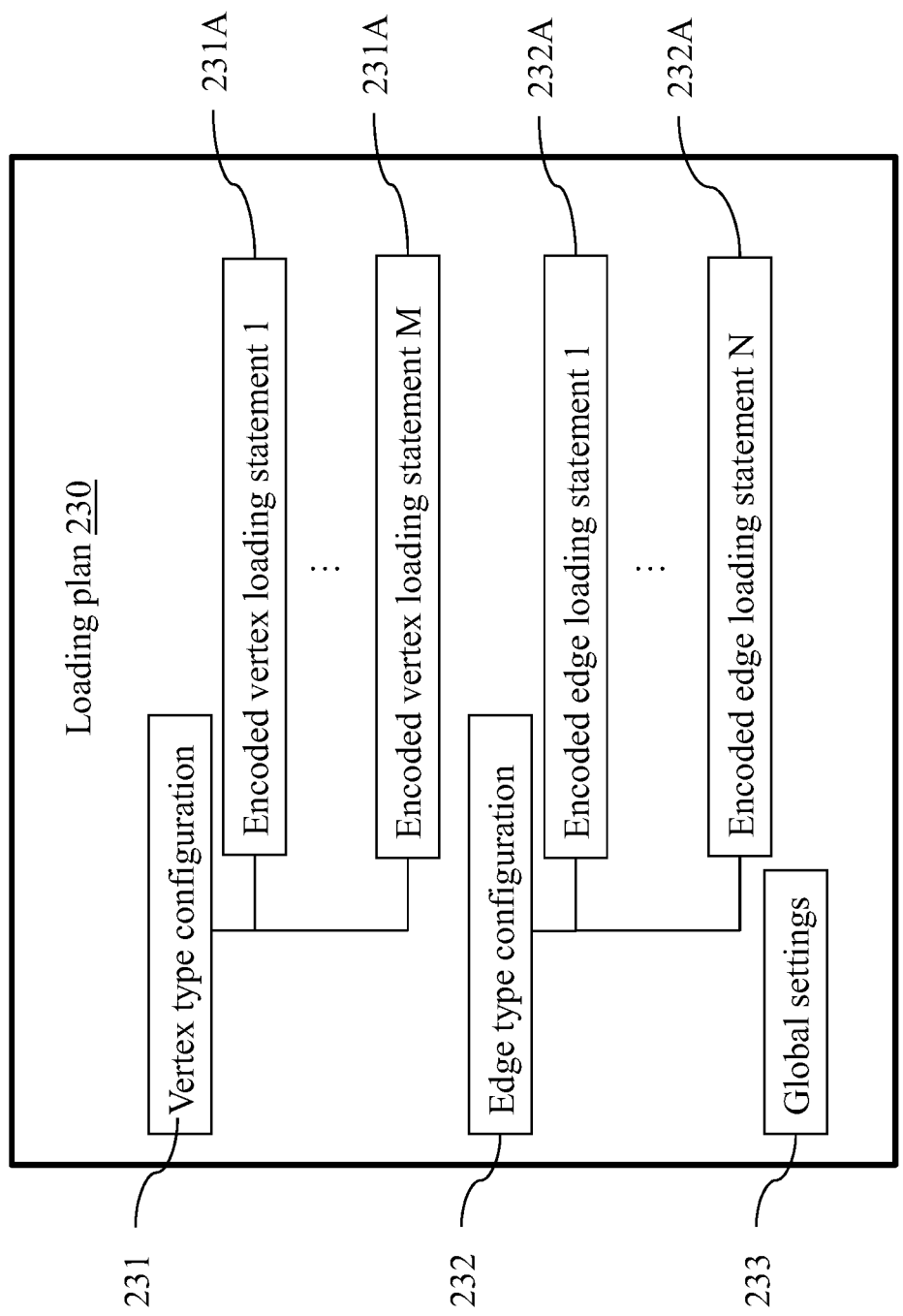
FIG. 6 is an exemplary diagram illustrating an embodiment of a loading plan based on the loading job of FIG. 2.

Turning to FIG. 6, an exemplary loading plan 230 is shown. The loading plan 230 can be in any suitable structure that can encode information from the loading job 200 to guide the loading engine 240. For example, FIG. 6 shows the loading plan 230 as having a tree structure. The loading plan 230 can be formed using any suitable structured data format. Exemplary structured data format can include YAML Ain't Markup Language (YAML), JavaScript Object Notation (JSON), Extensible Markup Language (XML), or a combination thereof.

The loading plan 230 can include the transformation function names, mappings and/or high level meta data. Exemplary high level meta data can include global settings 233 for representing the global setting information of the loading job 200 (shown in FIG. 2). The information encoded in the tree structure can be in a high level language and/or in machine code. In some embodiments, the information encoded in the tree structure can be in a high level language instead of the machine code.

As shown in FIG. 6, the loading plan 230 can include a vertex type configuration 231. The vertex type configuration 231 can include a list of encoded vertex loading statements 231A. Additionally and/or alternatively, the loading plan 230 can include an edge type configuration 232. The edge type configuration 232 can include a list of encoded edge loading statements 232A. The number M of the encoded vertex loading statements 231A can be the same as and/or different from the number N of the encoded the encoded edge loading statements 232A. Table 9 shows exemplary sections and fields of each section in the loading plan 230.

TABLE 9

| Section | Fields |
|---|---|
| Vertex type configuration 231 | Each encoded Vertex Loading Statement 231A can include the following fields:<br>target vertex name<br>List of column mappings from the source data 220 to graph model 100.<br>Each mapping can include a recursive structure that is allowed to have arbitrary depth of nested token function transformation.<br>Source Data location<br>Some other properties. |
| Edge type configuration 232 | Each encoded edge Loading Statement 232A can include the following fields:<br>target edge name<br>host graph<br>List of column mappings from the source data 220 to the graph model 100<br>Source Data Location<br>Some other properties |
| Global settings 233 | Including the following fields:<br>Filter List<br>UserDefinedHeaders<br>Some other properties such as token buffer size, log file name etc. |

In one example, the loading statement in line 2 of Table 3 can be interpreted into the encoded loading statement in Table 10-1.

TABLE 10-1

| Line | Encoded loading statement |
|---|---|
| 1 | VertexTypeConfigs : |
| 2 | - VertexName : person |
| 3 | - ColunimMapping : |
| 4 | - Index: |
| 5 | SrcColIndex : 0 |
| 6 | SrcColName : name |
| 7 | - Index: |
| 8 | SrcColIndex : 1 |

TABLE 10-1-continued

| Line | Encoded loading statement |
|---|---|
| 9 | SrcColName : id |
| 10 | - SourceData : /home/ user /product/ gsql /./ p1.csv |
| 11 | - Header: true |
| 12 | - Quote: double |
| 13 | - Separator : , |

The exemplary encoded loading statement includes instructions to load p1.csv to the vertex type "person." The loading plan 230 can have a property VertexName, a list of index to encode column mappings, and the source data 220 mapping to the vertex type "person." The loading plan 230 can indicate a header line existing flag and the double quotes for property to indicate each column from the source file is surrounded by double quotes.

When the loading plan 230 has the tree structure, a chain of UDFs can be encoded in a nested manner. In other words, the tree structure can be recursive. For example, the loading statement in lines 4-5 of Table 3 can be interpreted into the encoded vertex loading statement in Table 10-2. The encoded loading statement shows a plurality of levels of UDFs.

TABLE 10-2

| Line | Encoded loading statement |
|---|---|
| 1 | VertexTypeConfigs : |
| 2 | - VertexName : movie |
| 3 | - ColuninMapping : |
| 4 | - Index: |
| 5 | SrcColIndex : 0 |
| 6 | SrcColName : id |
| 7 | - Index: |
| 8 | IndexList : |
| 9 | - Literal : movie_ |
| 10 | - IndexList : |
| 11 | - Literal : 2015_ |
| 12 | - IndexList : |
| 13 | - Literal : usa_ |
| 14 | - SrcColIndex : 1 |
| 15 | SrcColName : title |
| 16 | UdfName: gsql_concat |
| 17 | UdfName: gsql_concat |
| 18 | UdfName: gsql_concat |
| 19 | - SourceData : /home/ user /product/ gsql /./m1. csv |
| 20 | - Header: true |
| 21 | - Quote: double |
| 22 | - Separator: , |

As shown in Table 10-2, a first UD gsql_concat can concatenate "usa_" literal with $"title" token. Result of the concatenation can be concatenated with "2015_" prefix, result of which can be concatenated with "movie_" prefix. The final result can be stored as value of the attribute "title" of the vertex type "movie." The interpreter 260 (shown in FIG. 2) can follow the tree structure and apply the UDFs from a bottom level to the top level in progression to yield a final transformation result.

Edge loading statements can be encoded in a similar manner as the vertex loading statement.

Table 10-3 shows creation of a target schema and an exemplary loading job 200 based on the target schema.

TABLE 10-3

| Line | Instruction |
|---|---|
| 1 | create vertex person(primary_id name string, secondary_id id |
| 2 | uint, name string) |
| 3 | create vertex movie (primary_id id uint, title string, country |
| 4 | string compress, year uint) |
| 5 | create directed edge roles(from person, to movie, role string) |
| 6 | create undirected edge all2all (from *, to *, role string) |
| 7 | create graph Demo (person, movie, roles, all2all) |
| 8 | set sys.data_root = "./resources/data_set/gsql/" |
| 9 | create loading job initJob for graph Demo { |
| 10 |   load "$sys.data_root/p1.csv" to vertex person values |
| 11 | ($"name",$"id", _) using header="true", separator=",", |
| 12 | quote="double"; |
| 13 |   load "$sys.data_root/p1.csv" to vertex person values |
| 14 | (NULL,$"id", "AA") using header="true", separator=",", |
| 15 | quote="double"; |
| 16 |   load "$sys.data_root/m1.csv" to vertex movie values ($"id", |
| 17 | $"title", $"country", $"year") using header="true", separator=","; |
| 18 |   load "$sys.data_root/r1.csv" to edge roles values ($"personId", |
| 19 | $"movieId", $"role") using header="true", separator=","; |
| 20 | } |

Table 10-4 shows an exemplary loading plan 230 based on the loading job 200 defined in Table 10-3.

TABLE 10-4

Loading plan 230

```
EdgeTypeConfigs:
-       AttStartPos: 2
        Attributes:
        -               AttributeName: role
                        AttributeType: STRING
        ColumnMapping:
        -               PrimitiveIndex:
                                SrcColIndex: 0
                                SrcColName: personId
        -               PrimitiveIndex:
                                SrcColIndex: 1
                                SrcColName: movieId
        -               PrimitiveIndex:
                                SrcColIndex: 2
                                SrcColName: role
        EdgeId: 0
        EdgeName: roles
        FileName: /home/author/product/gsql/./r1.csv
        FromPrimaryId:
                        AttributeName: name
                        AttributeType: STRING
        FromSecondary: false
        FromVertexAttributes:
        -               AttributeName: name
                        AttributeType: STRING
        FromVertexId: 0
        FromVertexName: person
        Header: true
        IsDirected: true
        MaxTokenCount: 3
        OriginalFileName: /r1.csv
        SchemaLen: 3
        Separator: ','
        SysVar: 1
        ToPrimaryId:
                        AttributeName: id
                        AttributeType: UINT
        ToSecondary: false
        ToVertexAttributes:
        -               AttributeName: title
                        AttributeType: STRING
        -               AttributeName: country
                        AttributeType: UINT
                        Enumerator: 1
        -               AttributeName: year
                        AttributeType: UINT
        ToVertexId: 1
        ToVertexName: movie
```

TABLE 10-4-continued

Loading plan 230

```
FilterList: [ ]
GraphId: 0
GraphName: Demo
JobName: initJob
LibUseStatus: 2
LoaderConfigVersion: 1
OutputTokenBufferSize: 16000000
VertexTypeConfigs:
- AttStartPos: 2
  Attributes:
  - AttributeName: name
    AttributeType: STRING
    ColumnMapping:
    - PrimitiveIndex:
      SrcColIndex: 0
      SrcColName: name
    - PrimitiveIndex:
      SrcColIndex: 1
      SrcColName: id
    - PrimitiveIndex:
      Literal: _
  FileName: /home/ author /product/gsql/. /p1 csv
  Header: true
  MaxTokenCount: 2
  OriginalFileName: /p1 csv
  Primaryvd:
    AttributeName: name
    AttributeType: STRING
  Quote: double
  SchemaLen: 3
  SecondaryIds:
  - AttributeName: id
    AttributeType: UINT
  Separator: ','
  SysVar: 1
  UseSecondaryId: true
  VertexId: 0
  VertexName: person
- AttStartPos: 2
  Attributes:
  - AttributeName: name
    AttributeType: STRING
    ColumnMapping:
    - PrimitiveIndex:
      Literal: \0
    - PrimitiveIndex:
      SrcColIndex: 1
      SrcColName: id
    - PrimitiveIndex:
      Literal: AA
  FileName: /home/ author /product/gsql/. /p1 csv
  Header: true
  MaxTokenCount: 2
  OriginalFileName: /p1 csv
  PrimaryId:
    AttributeName: name
    AttributeType: STRING
  Quote: double
  SchemaLen: 3
  SecondaryIds:
  - AttributeName: id
    AttributeType: UINT
  Separator: ','
  SysVar: 1
  UseSecondaryId: true
  VertexId: 0
  VertexName: person
- AttStartPos: 1
  Attributes:
  - AttributeName: title
    AttributeType: STRING
  - AttributeName: country
    AttributeType: UINT
    Enumerator: 1
  - AttributeName: year
    AttributeType: UINT
  ColumnMapping:
  - PrimitiveIndex:
```

TABLE 10-4-continued

Loading plan 230

Figure 7:
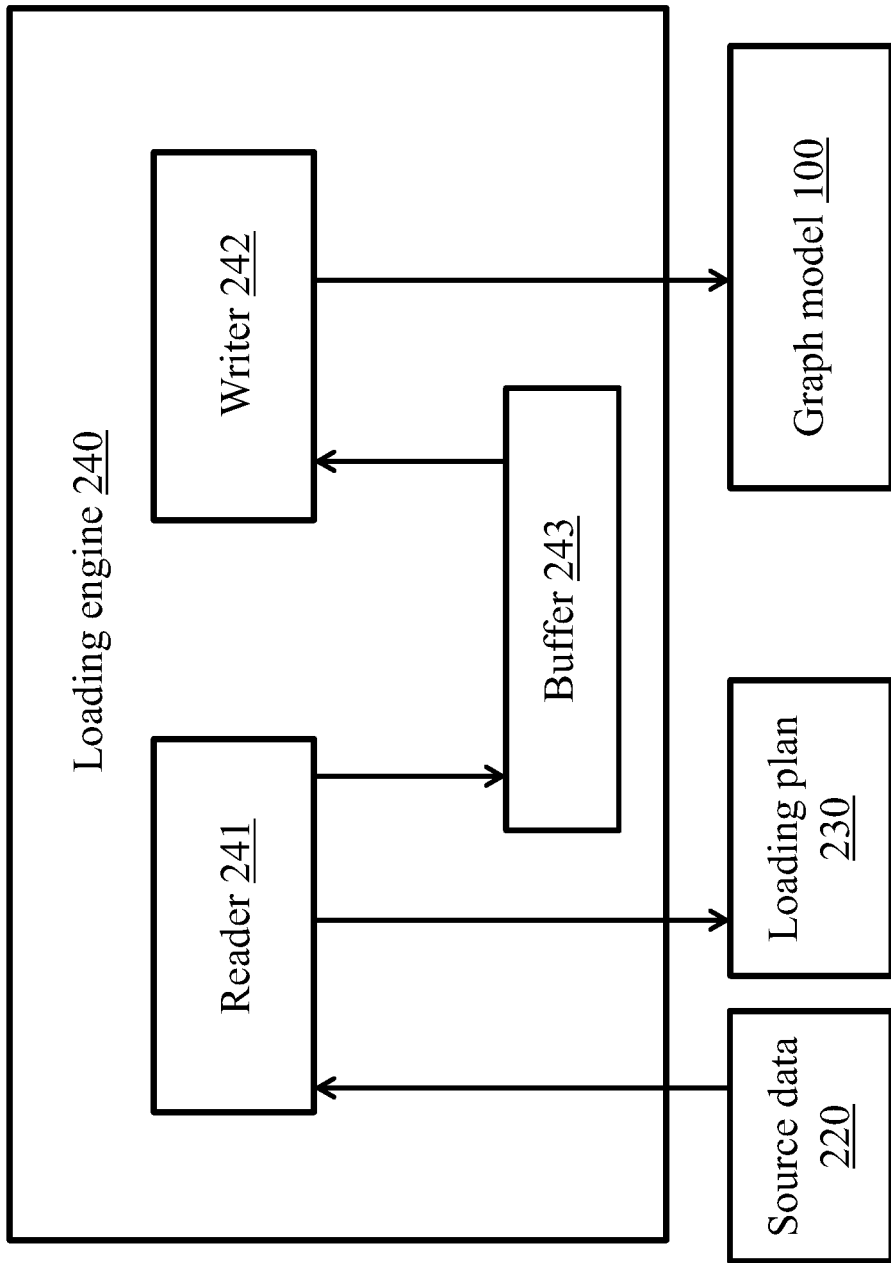
FIG. 7 is an exemplary block diagram illustrating an embodiment of a loading engine for loading data based on the loading plan of FIG. 6.

SrcColIndex: 0
SrcColName: id - PrimitiveIndex:
n      ndexElementList:
- SrcColIndex: 1
SrcColName: title
- Literal: a
UdfName: gsql_concat
- PrimitiveIndex:
SrcColIndex: 2
SrcColName: country
- PrimitiveIndex:
SrcColIndex: 3
SrcColName: year
FileName: /home/ author /product/gsql/. /m1 csv
Header: true
MaxTokenCount: 4
OriginalFileName: /m1 csv
PrimaryId:
AttributeName: id
AttributeType: UINT
SchemaLen: 4
Separator: ','
SysVar: 1
VertexId: 1
VertexName: movie Turning to FIG. 7, an exemplary block diagram of the loading engine 240 is shown. The loading engine 240 is illustrated as including a reader 241, a writer 242, and/or a buffer 243. Each of the reader 241, the writer 242, and/or the buffer 243 can include a set of coded instructions for executing respective functions.

The reader 241 can read the source data 220 to extract lines and tokenize each line. For example, the reader 241 can create a sequence of tokens, one line at a time, from the source data 220. The buffer 243 can store tokens and/or lines that the reader 241 extracts from the source data 220. The writer 242 can transmit the tokens and/or lines to the graph model 100. For example, the writer 242 can write message and/or information generated by the loading engine 240 to a destination via a communication channel. The writer 242 can write message and/or information in a binary format. The binary format can be understood by a computer system receiving the message and/or information at the destination.

The loading engine 240 can include instructions for implementing (and/or calling) the reader 241, the writer 242, and/or the buffer 243.

Optionally, the graph model 100 can be stored in a graph store (not shown). The graph store can include a data storage system for storing data organized in the graph model 100.

The exemplary loading engine 240 can be in a high-level language including, for example, C, C++, Javascript, and/or the like. In some embodiments, the loading engine 240 can be compiled into a native machine code.

During loading, the loading engine 240 can invoke the reader 241 to traverse line by line in the source data 220. For each line, the reader 241 can be instructed by, and/or can consult, the loading plan 230 for schema mapping, and/or can dynamically loading UDFs from the library 250 (shown in FIG. 5) to do token transformation, data filtering and/or data validation, at least partially in native machine code.

A configuration of the loading engine 240 can be modified based, for example, on operating system software and/or native machine code of the system 300 (shown in FIG. 3), type of source data 220, and/or output format of the graph model 100. Stated somewhat differently, the loading engine 240 can be configured to adapt to any combination of operating system software and/or native machine code of the system 300, type of source data 220, and/or output format of the graph model 100. In certain examples, the loading engine 240 can include one or more templates to suit different combinations of the above parameters. An operator and/or the system 300 can select the appropriate template to be used as the loading engine 240.

Exemplary source data 220 can include Unix files and/or online HTTP streams. Exemplary output format of the graph model 100 can include network output streams (such as online HTTP streams) and/or Unix files. In one example, when the source data 220 includes Unix files and the graph model 100 is in a format of Unix files, the system 300 can select a first template of the loading engine 240. In another example, when the source data 220 includes online HTTP streams and the graph model 100 is in a format of online HTTP streams, the system 300 can select a second template of the loading engine 240.

Table 11-1 shows exemplary pseudo code of the loading engine 240. The pseudo code illustrates high-level algorithm that uses the reader 241, the writer 242, and the loading plan 230 to implement mapping.

TABLE 11-1

| Line | Instruction |
|------|-------------|
| 1 | @input: Reader Instance, Writer instance, Buffer instance |
| 2 | We will process loading based on distinct src file. |
| 3 | We have two buffers. |
| 4 | - line buffer (reader provide) |
| 5 | - outputTokenBuffer[4] |
| 6 | - outputTokenBuffer1 //from/primary |
| 7 | - outputTokenBuffer2 //to/secondary |
| 8 | - outputTokenBuffer3 //att buffer |
| 9 | - flattenOutputBuffer //temp table flatten output buffer |
| 10 | //initialize util with writer and jobconfig, such that |
| 11 | util.loadVertexFromSrc( ) and util.loadEdgeFromSrc( ) can use the |
| 12 | writer |
| 13 | //to write loading results |
| 14 | util->Init(JobConfig, writer instance); |
| 15 | //determine the distinct srcs |
| 16 | srcs[ ] = util.GetDistinctSrc(JobConfig) |
| 17 | foreach (src: srcs) { |
| 18 |  Reader.Init(src); |
| 19 |  util.InitSrcTargetObjects(src, v_current_vertex, |
| 20 |   e_current_vertex, t_current_vertex, global_max_position); |
| 21 |  for (uint32_t i = 0; i < t_current_vec.size( ); i++) { |
| 22 |   util->InitTempTableSrcTargets(t_current_vec[i].TableName, |
| 23 |   v2_current_vec[i], e2_current_vec[i]); |
| 24 |  } |
| 25 |  for (i = 0; i < Reader.GetFileCount( ); i++) { |
| 26 |   Reader.OpenFile(i); |
| 27 |   while (Reader.MoveNextLine( )) { |
| 28 |    Populate position_map; |
| 29 |    util.loadVertexFromSrc(v_current_vertex, positionMap, |
| 30 |     outputTokenBuffer[4]); |
| 31 |    util.loadEdgeFromSrc(e_current_vertex, positionMap, |
| 32 |     outputTokenBuffer[4]); |
| 33 |    foreach (t: t_current_vertex){ |
| 34 |     Call flatten function to produce tuples Token; |
| 35 |     - allocate tokenBuffer foreach |
| 36 |     v2_current_vertex[k].PrimaryIdBuffer |
| 37 |     - allocate tokenBuffer foreach |
| 38 |     v2_current_vertex[k].SecondaryIdBuffer |
| 39 |     foreach (tuple: tuples Token) { |
| 40 |      Populate position_map2 based on t; |
| 41 |      Note: positionMap2 [tableLen] points to new buffer. |
| 42 |      util.loadVertexFromTempTable(v2_current_vertex, |
| 43 |      positionMap2, |
| 44 |       outputTokenBuffer[ ]); |
| 45 |      util.loadEdgeFromTempTable(e2_current_vertex, |
| 46 |       positionMap2, outputTokenBuffer[ ]); |
| 47 |     } //end flatten |
| 48 |     - release tokenBuffer foreach |
| 49 |     v2_current_vertex[k].PrimaryIdBuffer = 0 |
| 50 |     - release tokenBuffer foreach |

TABLE 11-1-continued

| Line | Instruction |
|---|---|
| 51 |          v2_current_vertex[k].SecondaryIdBuffer = 0 |
| 52 |       }//end temp table loop |
| 53 |     }//end while loop |
| 54 |    Reader.CloseFile( ); |
| 55 |   }//end Reader current src file loop |
| 56 | }//end foreach src |

In Table 11-1, line 16 can obtain the loading plan 230 (referred to as "JobConfig" in Table 11-1). Line 17 can instruct a loop of Lines 18-56 for reading each source (for example, source file) once, and share result of reading the source among all relevant loading statements. Line 18 can instruct the reader 241 to locate the source file of the source data 220. Line 26 can instruct the reader 241 to open the source file. Line 27 can read line by line for a current source file. Lines 28-53 can process each loading statement related to the current source file.

Line 28 can instruct the reader 241 to start to populate a position map in the buffer 243. The position map can include an index system for storing and/or locating a token and/or for storing and/or locating result of the UDF transforming the token. Lines 29-32 can instruct the reader 241 to extract the source data 220 into tokens according to the loading plan 230. Lines 33-43 can instruct the reader 241 to store the tokens in the buffer 243.

The reader 241 can implement a plurality of functions. In some embodiments, the reader 241 needs to be capable of implementing such functions in order to be plugged into the loading engine 240. Table 11-2 shows an exemplary reader 241. Functions of the reader 241 are shown in pseudo code.

TABLE 11-2

| Line | Instruction |
|---|---|
| 1 | - Reader(string dataSourceName) //a constructor which takes a data |
| 2 |   source name, could be a URL, a file name or a directory name etc. |
| 3 | - void Init(string dataSrc) //a function to initialize the reader |
| 4 | - int GetFileCount( ) //a function to return how many files need to |
| 5 |   be processed from the data source. |
| 6 | - string GetCurrentFileName( ) //at any time, calling this function |
| 7 |   will return the current file name |
| 8 | - void OpenFile(int idx) //open the current file indexed by idx. |
| 9 | - void CloseFile( ) //close the current file |
| 10 | - bool MoveNextLine( ) //move the read head to the next line, |
| 11 |   return true if succeed. |
| 12 | - bool NextString(char*& strptr, size_t& strlength, char |
| 13 |   separator) //return next token until end of line |

The writer 242 can implement a plurality of functions. In some embodiments, the writer 242 needs to be capable of implementing such functions in order to be plugged into the loading engine 240. Table 11-3 shows an exemplary writer 242. Functions of the writer 242 are shown in pseudo code. The writer 242 can write information of a vertex 110 (shown in FIG. 1) in binary format.

TABLE 11-3

| Line | Instruction |
|---|---|
| 1 |    //a function to take a vertex binary information and write it |
| 2 |   out to the communication channel at choice of the writer |
| 3 |    - bool FlushVertex(int vTypeId, //vertex type id |
| 4 |       char* attBuffer, //attribute buffer |
| 5 |       uint32_t attBufferLen, //attribute length |
| 6 |       char* externalPrimaryIdPtr, //primaryId buffer |
| 7 |       uint32_t externalPrimaryIdLen, //primaryId length |

TABLE 11-3-continued

| Line | Instruction |
|---|---|
| 8 |       bool useSecondaryId=false, //secondaryId use flag |
| 9 |       char* externalSecondaryIdPtr=0, //secondary id buffer |
| 10 |       uint32_t externalSecondaryIdLen=0) //secondary id length |

Table 11-4 shows another exemplary writer 242. Functions of the writer 242 are shown in pseudo code. The writer 242 can write information of an edge 120 (shown in FIG. 1) in binary format.

TABLE 11-4

| Line | Instruction |
|---|---|
| 1 |    //a function to take an edge binary information and write it out |
| 2 |   to the communication channel at choice of the writer |
| 3 |    - bool FlushEdge (int eTypeId, //edge type id |
| 4 |       int fromVTypeId, //from vertex type id |
| 5 |       int toVTypeId, //to vertex type id |
| 6 |       char* fromIdPtr, // buffer of from vertex id |
| 7 |       uint32_t fromIdLen, // length of from vertex id |
| 8 |       char* toIdPtr, // buffer of to vertex id |
| 9 |       uint32_t toIdLen, // length of to vertex id |
| 10 |       char* eAttBuffer, // buffer of edge attribute |
| 11 |       uint32_t eAttBufferLen, // length of edge attribute |
| 12 |       bool directedEdge, //directed or undirected edge |
| 13 |   indicator |
| 14 |       int reverseETypeId = -1, //have reverse edge indicator |
| 15 |       bool fromSecondary = false, //use secondary id of from |
| 16 |   vertex indicator |
| 17 |       bool toSecondary = false, // use secondary id of to |
| 18 |   vertex indicator |
| 19 |       bool addNewVertex = true) //generate from or to vertex |
| 20 |   if missing |

The loading engine 240 can advantageously optimize processing of the encoded loading statements in the loading plan 230. In one example, the loading engine 240 can group encoded loading statements based on source of the source data 220 for the loading statements. For loading graph data, one source of source data 220 can contribute to multiple vertex types and/or edge types. Each loading statement can correspond to one source file. Therefore, by grouping the loading statements based on source, cost of the deserialization of the same source file can advantageously be saved.

In another example, the system 300 can deserialize the source data 220, and put tokens into a line buffer of the buffer 243 and assign a token position mapping. Starting position of each token in the buffer 243 can thus be recorded using the token position mapping. The buffer 243 and the position map can be ready for each loading statement that shares the source file. The loading engine 240 thus does not need to deserialize the same source data 220 more than once even if the source data 220 is used for multiple loading statements. Advantageously, significant amount of time and computing resource for reading the source data 220 can be saved.

Additionally and/or alternatively, the buffer 243 can use a token buffer to share result of each token transformation. That is, if the same token transformation on a token is used multiple times, the loading engine 240 can do the transformation once, and share the result with multiple instances of the token transformation.

Figure 8:
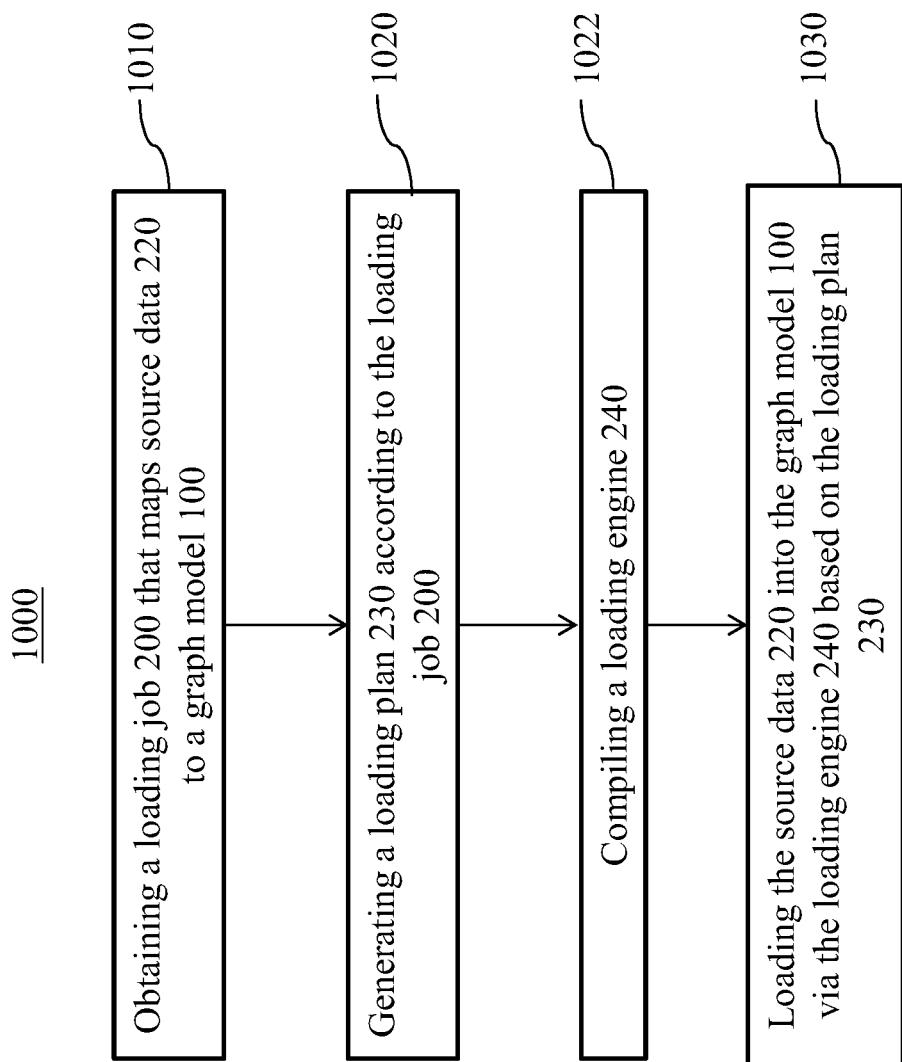
FIG. 8 is an exemplary flow chart illustrating an alternative embodiment of the method of FIG. 4, wherein the method includes compiling a loading engine.

Turning to FIG. 8, an alternative embodiment of the exemplary method 1000 is shown. The loading engine 240 based on the loading plan 230 is compiled, at 1022. The loading engine 240 can be compiled into the machine code (or native code) of the system 300 (shown in FIG. 3). The loading engine 240 can loading the source data 220 based on the loading plan 230. Stated somewhat differently, the loading engine 240 can be pre-compiled, and can execute a loading plan 230 that is generated according to any user-declared loading job 200. Similarly, the reader 241 (shown in FIG. 7) and/or the write 242 (shown in FIG. 7) can be pre-compiled.

Commands for interpreting the loading job 200 into the loading plan 230 and/or invoking the loading engine 240 can be implemented via any suitable user interface provided by an operating system. When the user interface includes a Unix shell, for example, can invoke the interpreter 260 (shown in FIG. 5) to generate the loading plan 230 and invoke the loading engine 240 to implement the loading plan 230.

Although FIG. 8 shows compiling of the loading engine 240 as being after generating the loading plan 200 for illustrated purposes only, compiling of the loading engine 240 can be at any time prior to loading the source data 220, without limitation. For example, the loading engine 240 can be compiled prior to obtaining the loading job 200.

In certain embodiments, the system 300 (shown in FIG. 3) can include a compiler (not shown) executed by the processor 310 (shown in FIG. 3) for compiling the loading engine 240. The compiler can be selected based on the type of language of the loading engine 240 and/or the machine code of the system 300.

As the loading engine 240 is pre-compiled, when the source data 220 are changed, the loading engine 240 can load the changed source data 220. The loading engine 240 does not need to be compiled again for loading the source data 220. Similarly, for any newly-declared loading job 200 and the accordingly-generated loading plan 230, the loading engine 240 does not need to be compiled again. The compiling of the loading engine 240 can be executed no more than once because the compiling can be independent of modification of the loading job 200 or the source data 220. Therefore, the loading engine 240 can load the modified source data 220 into the graph model 100 (shown in FIG. 7) as soon as the source data 220 or the loading plan 230 are available. Time required for loading new data can be reduced because significant time and machine resource needed for compiling the loading engine 240 can be reduced. Advantageously, loading of the source data 220 can be fast and efficient.

Figure 9:
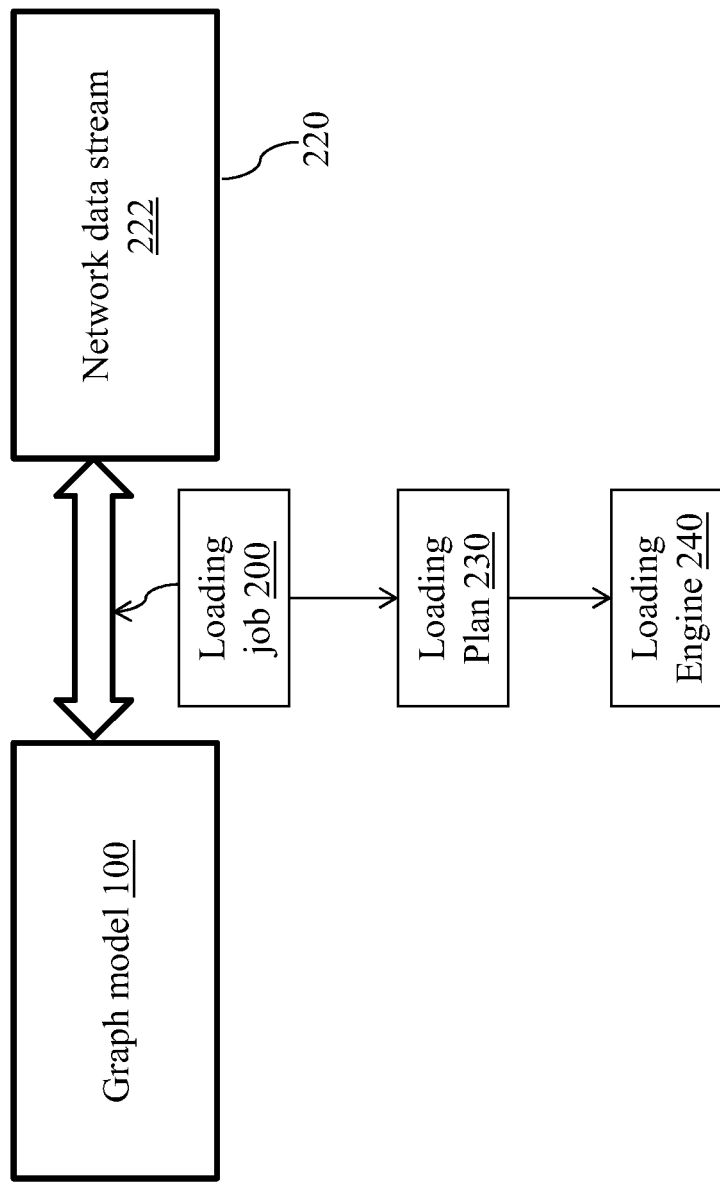
FIG. 9 is an exemplary block diagram illustrating another alternative embodiment of the loading job of FIG. 2, wherein the source data includes network data stream.

Turning to FIG. 9, the source data 220 can include network data stream 222. Exemplary network data stream 222 can include online HTTP data stream. The network data stream 222 can include data that intermittently and/or continuously generated. For example, the network data stream 222 can have a tabular row format and be generated one or more rows at a time. Exemplary applications of the network data stream 222 can include client activity record of a bank website, an e-commerce website, user sign-up record of any online services, and/or the like.

Without the disclosed methods and systems, data loading system may not be stand-alone from source data. A network data stream may need to combine all the rows of data into a source file to be loaded into a graph model. Loading thus cannot be implemented in real time. Alternatively, a loading engine may need to be compiled every time when new rows of data are generated. Loading can thus be time-consuming and computing-resource-consuming.

In contrast, in accordance with the present disclosure, the network data stream 222 can be loaded in real time as new rows of data are generated. Advantageously, loading can thus be fast and high-performance.

Further, without the disclosed systems and methods, a loading system may need to read the source data 220 multiple times to extract data. For the network data stream 222, reading newly added data multiple times, when new data are constantly generated, can cost considerable time and computing resource. Such reading can be impractical to implement.

In contrast, in accordance with the present disclosure, data can be extracted from new data of the network data stream 222 in a single pass, making loading of the network data stream 222 timely and easy to implement.

Figure 10:
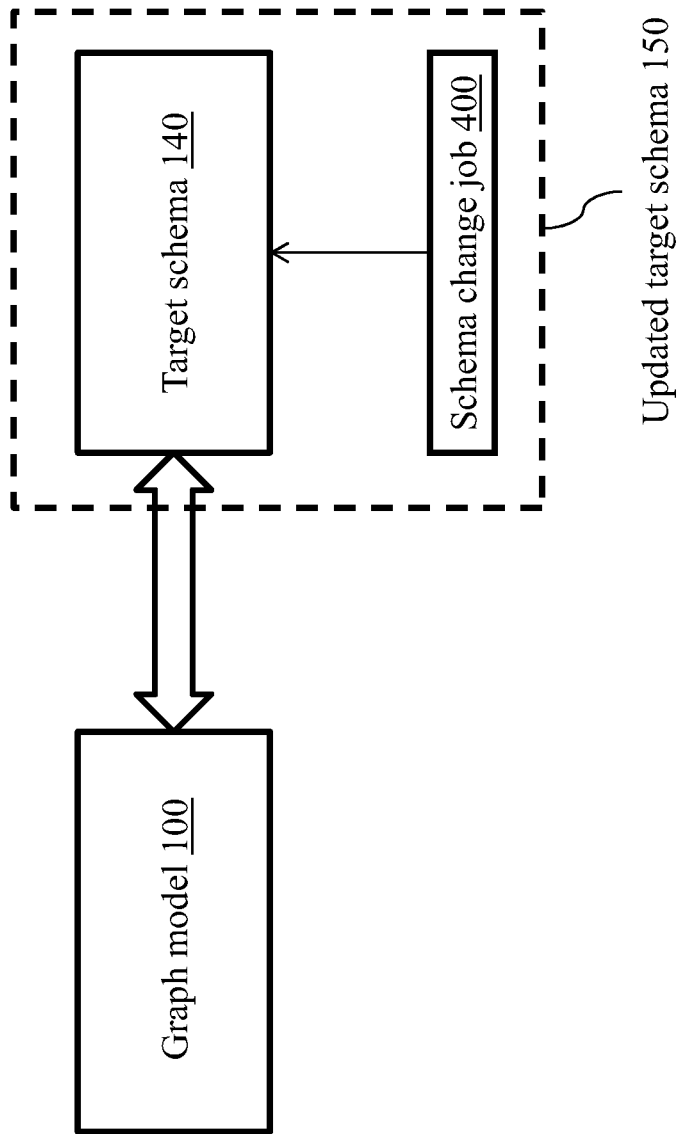
FIG. 10 is an exemplary block diagram illustrating an embodiment of a schema change job being applied to target schema of the graph model of FIG. 1.

Turning to FIG. 10, a target schema 140 and the graph model 100 based on the target schema 140 is shown. A schema change job 400 can update the target schema 140 to generate an updated target schema 150. The source data 220 (shown in FIG. 2) previously loaded into the graph model 100 can be updated correspondingly in order to be consistent with the updated target schema 150.

Updating of the target schema 140 can include any types of changes to the target schema 140. Exemplary changes can include adding a new vertex type, adding a new edge type, dropping (or deleting or removing) a vertex type, dropping an edge type, adding a new attribute to a vertex type, adding a new attribute to an edge type, dropping an attribute from a vertex type, dropping an attribute from an edge type, or a combination thereof.

An exemplary schema change job 400 can be defined by an operator via a user interface (not shown) provided by the system 300 (shown in FIG. 3). The user interface can include graphical user interface and/or a declarative language have predetermined syntax known to the operator.

Table 12 shows an example of defining the schema change job 400 using the declarative language.

TABLE 12

| Line | Instruction |
|---|---|
| 1 | #1schema setup |
| 2 | CREATE VERTEX customer (PRIMARY_ID cid INT, name |
| 3 | STRING, age INT) |
| 4 | CREATE VERTEX product (PRIMARY_ID pid INT, name |
| 5 | STRING, brand STRING) CREATE DIRECTED EDGE purchase |
| 6 | (FROM customer, TO product, purchaseTime INT) CREATE |
| 7 | UNDIRECTED EDGE related (FROM customer, TO product) |
| 8 | CREATE GRAPH shopping (customer, product, purchase, related) |
| 9 | #1 Load data |
| 10 | #2 create a schema change job. |
| 11 | # such as add/drop an attribute of a vertex/edge; |
| 12 | # add/drop a vertex or an edge. |
| 13 | CREATE SCHEMA_CHANGE JOB schema_change_example FOR GRAPH |
| 14 | shopping { |
| 15 |    ADD VERTEX cashier(primary_id id uint, name string); |
| 16 |    DROP EDGE related; |
| 17 |    ALTER VERTEX customer ADD ATTRIBUTE (creditCard |
| 18 |                           STRING, phone STRING); |
| 19 |    ALTER VERTEX customer DROP ATTRIBUTE (age); |
| 20 |    ADD UNDIRECTED EDGE Transaction (FROM cashier, TO |
| 21 |    customer, puchaseTimeINT); |
| 22 | } |
| 23 | #3 run the schema_change job to update schema and |
| 24 | the loaded data. |
| 25 | RUN JOB schema_change_example |

In lines 1-8 of Table 12, a graph model 100 named "shopping" is created based on the target schema 140. The target schema 140 includes vertex types "customer" and "product," and edge types "purchase" and "related." The source data 220 can thus be loaded into the graph model 100 (as described in comment in line 9, coded instructions are not shown). The source data 220 can be loaded in a similar manner as shown in FIG. 4.

In lines 13-22 of Table 12, a schema change job 400 named "schema_change_example" is created for the graph model 100 "shopping." As shown in Table 12, lines 13-18, the schema change job 400 includes one or more schema change statements. Each schema change statement can specify a respective change.

The schema change job 400 in Table 12 includes adding a new vertex type named "cashier," dropping the edge type "related," adding attributes "creditcard" and "phone" to the vertex type "customer," dropping the attribute "age" from the vertex type "customer," and adding an edge type "transaction."

The schema change job 400 can be run based on a command by the operator. For example, in line 25 of Table 12, the "RUN JOB" command can run the schema change job 400.

Figure 11:
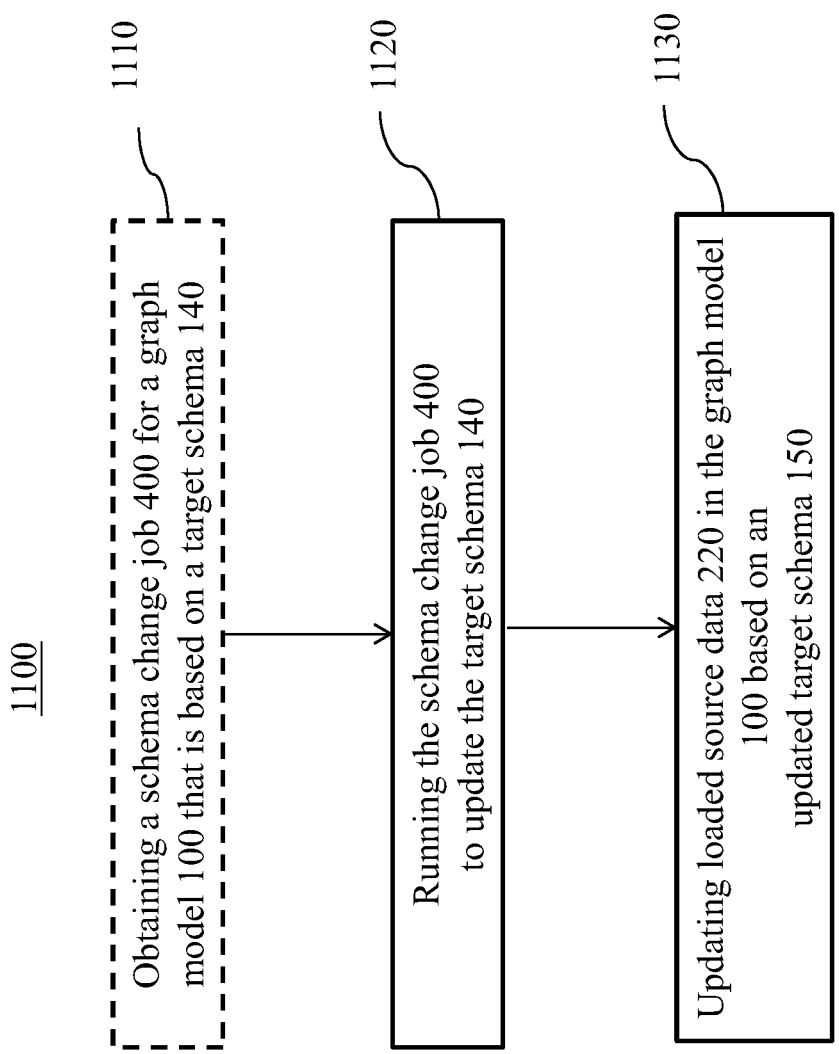
FIG. 11 is an exemplary flow chart illustrating an embodiment of a method for updating the target schema of FIG. 10.

Turning to FIG. 11, a method 1100 for updating the target schema 140 is shown. Optionally, the schema change job 400 for the graph model 100 that is based on a target schema 140 is obtained, at 1110. As shown in Table 12, line 12, the command "CREATE SCHEMA_CHANGE JOB" specifies that the schema change job 400 named "schema_change_example" is for the graph model 100 named "shopping."

The schema change job 400 is run, at 1120, to update the target schema 140. Updating the target schema 140 can include applying the changes specified in the schema change job 400 to the current target schema 140 to provide an updated target schema 150.

Optionally, the loaded source data 220 in the graph model 100 are updated, at 1130, based on the updated target schema 150. Stated somewhat differently, the source data 220 is previously loaded into the graph model 100 based on the current target schema 140. Upon the current target schema 140 being updated according to the schema change job 400, the loaded source data 220 can be updated to be consistent with the updated target schema 150.

The method 1100 provides a significantly improved solution to dynamic update of the target schema 140. Without the method 1100, when the target schema 140 is to be updated, the graph model 100 and the previously loaded source data 220 need to be deleted. A new target schema 140 needs to be defined. The source data 220 needs to be loaded. Therefore, defining the target schema 140 and loading the source data 220 need to be repeatedly performed each time when the target schema 140 needs to be updated. Such repetition can be very time-consuming and expensive (for example, consuming significant computation resources). In some cases, repeatedly loading the source data 220 may not be possible because the operator may no longer have original files of the source data 220 when the target schema 140 is updated.

In contrast, the method 1100 allows the target schema 140 to be updated after the source data 220 are loaded. The target schema 140 and the loaded source data 220, for example, can be updated at the same time so the updated source data 220 can be consistent with the updated target schema 150. The expensive process of reloading the source data 220 therefore can be avoided. The target schema 140 can continuously evolve based on needs of a user of the graph model 100.

Further, updating of the target schema 140 can include updating vertex types, edge types, and attributes thereof. Stated somewhat differently, the target schema 140 can be updated at a vertex type level, edge type level, and/or attribute level. Advantageously, the target schema 140 and/or the loaded source data 220 can be updated with great flexibility.

Figure 12:
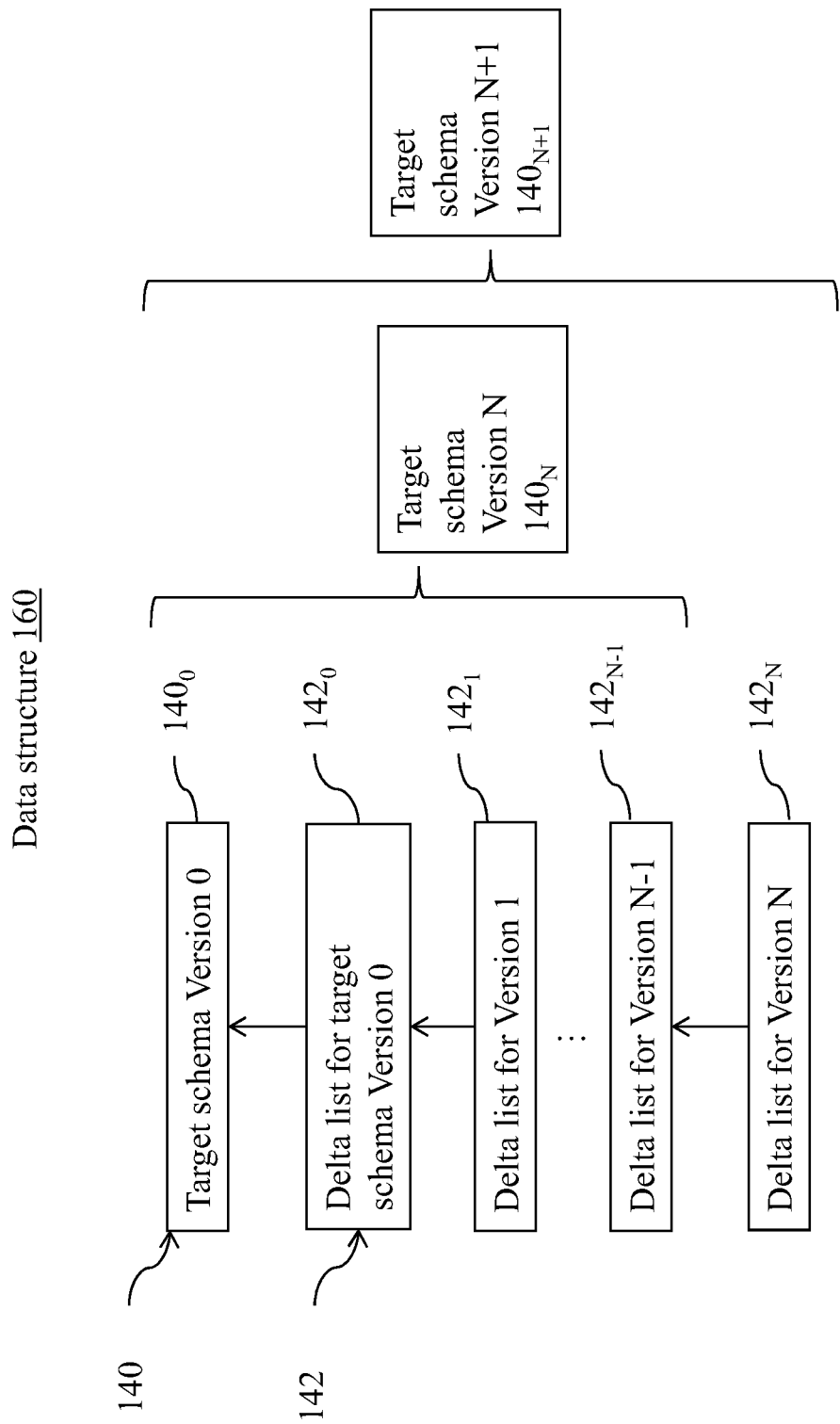
FIG. 12 is an exemplary block diagram illustrating an embodiment of a data structure of the target schema of FIG. 10.

Turning to FIG. 12, an exemplary data structure 160 of the target schema 140 is shown. The target schema 140 can include a target schema version 0 (or 140$_0$). The target schema version 0 can include any information of the target schema 140 as originally created. Exemplary information can include vertex types, edge types, and/or attributes thereof that are initially included in the target schema 140. Additionally and/or alternatively, the target schema 140 can include one or more delta lists 142. A delta list 142 can include changes to be made on a base version of the target schema 140. A delta list 142 and the corresponding base version of the target schema 140 can collectively form an updated version of the target schema 140. In other words, applying a delta list 142 can evolve the corresponding target schema 140 by one version.

As shown in FIG. 12, the target schema version N (or 140$_N$) can be a base version of the target schema 140 for the delta list 142$_N$. For example, the delta list 142$_{N-1}$ and target schema version N−1 (or 140$_{N-1}$) can collectively form the target schema 140$_N$. Similarly, the delta list 142$_N$ and target schema version N can collectively form the target schema 140$_{N+1}$.

The current target schema 140 can include the latest version of the target schema 140. In other words, the current target schema 140 can include the version 0 of the target schema 140 in combination with a history of all delta lists 142.

Each version of the target schema 140 and/or each of the delta lists 142 can be represented (or recorded, or archived) in any uniform and/or different forms. An exemplary target schema 140 and/or an exemplary delta list 142 can be represented at least partially in an array using Java Collections application programming interface (API), such as Java List. Table 13 shows exemplary contents of the data structure 160 represented via Java List.

TABLE 13

| Java list type | Contents |
|---|---|
| List<VertexType> VertexTypes | Vertex types of the latest version of the target schema 140 |
| List<EdgeType> EdgeTypes: | Edge types of the latest version of the target schema 140 |
| List<VertexType> InitVersionVertexTypes | Vertex types of Version 0 of the target schema 140 |
| List<EdgeType> InitVersionEdgeTypes | Edge types of Version 0 of the target schema 140 |
| List<VertexTypeDelta> VersionedVertexTypeDelta | Changes for vertex type from version 0 to the latest version of the target schema 140 (Information contained in each change is listed): Add a new vertex type: (1) information of a new vertex type. |

TABLE 13-continued

| Java list type | Contents |
|---|---|
| | (2) Base version number of the target schema 140 |
| | (3) DeltaType = NewVertex |
| | Drop an existing vertex type: |
| | (1) name of the vertex type to be dropped |
| | (2) Base version number of the target schema 140 |
| | (3) DeltaType = DeleteVertex |
| | Add some attributes to a vertex type: |
| | (1) name of the vertex type to be updated |
| | (2) new attribute(s) |
| | (3) Base version number of the target schema 140 |
| | (4) DeltaType = AddVertexAttributes |
| | Drop some attributes of a vertex type: |
| | (1) name of the vertex type to be updated |
| | (2) name(s) of the attribute to be dropped |
| | (3) Base version number of the target schema 140 |
| | (4) DeltaType = DropVertexAttributes |
| List<EdgeTypeDelta> VersionedEdgeTypeDelta: | Changes for edge type from version 0 to the latest version of the target schema 140 (Information contained in each change is listed): |
| | Add a new edge type: |
| | (1) information of a new edge type. |
| | (2) Base version number of the target schema 140 |
| | (3) DeltaType = NewEdge |
| | Drop an existing edge type: |
| | (1) name of the edge type to be dropped |
| | (2) Base version number of the target schema 140 |
| | (3) DeltaType = DeleteEdge |
| | Add some attributes to an edge type: |
| | (1) name of the edge type to be updated |
| | (2) new attribute(s) |
| | (3) Base version number of the target schema 140 |
| | (4) DeltaType = AddEdgeAttributes |
| | Drop some attributes of an edge type: |
| | (1) name of the edge type to be updated |
| | (2) name(s) of the attribute to be dropped |
| | (3) Base version number of the target schema 140 |
| | (4) DeltaType = DropEdgeAttributes |
| LatestVertexId: | The next un-used vertex type id |
| LatestEdgeId: | The next un-used edge type id. Each edge type has a global unique integer identifier. This field store the next un-used edge type id. |
| version: | The current graph version |

Therefore, each of delta lists 142 can use "List<VertexTypeDelta> VersionedVertexTypeDelta" and "List<EdgeTypeDelta> VersionedEdgeTypeDelta" to represent changes related to vertex types and edge types (and/or attributes thereof), respectively. In certain examples, the terms "VersionedVertexTypeDelta" and/or "VersionedEdgeTypeDelta" can be customized to include any names for conveniently identifying the changes and/or the base version number.

For example, the delta list 142 can be extracted from the current schema change job 400 (shown in FIG. 10). The delta list 142 can be represented in the data structure 160 to be associated with the version number of the current target schema 140. Changes specified in the delta list 142 can be listed, for example, as shown in Table 13.

As shown in Table 13, each change in vertex type can be encapsulated in the "VertexTypeDelta" class. A selected change can include exemplary information such as a base version number, and/or a change type. This base version number can indicate the version of the target schema 140 to which the change applies. Each change can have a delta type to indicate the type of the change. Similarly, each change in edge type can be encapsulated in the "EdgeTypeDelta" class. The change can include exemplary information such as the base version number, and/or the change type.

Figure 13:
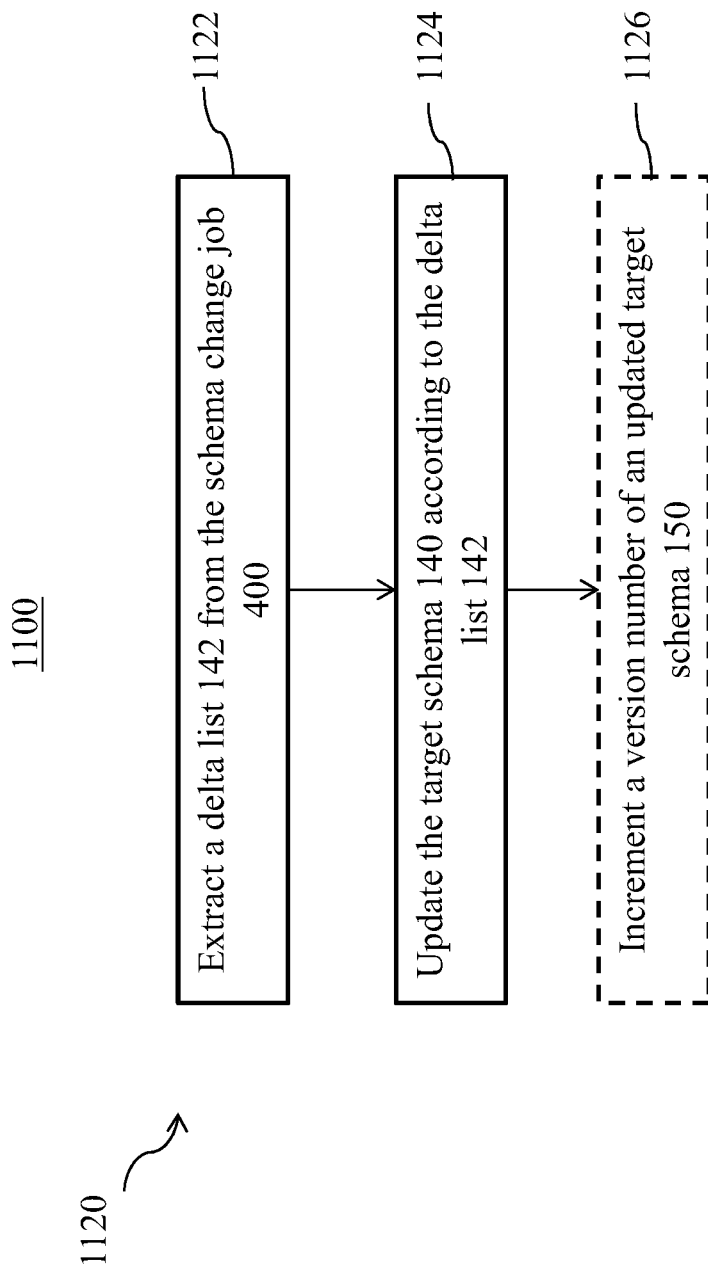
FIG. 13 is an exemplary flow chart illustrating an alternative embodiment of the method of FIG. 11, wherein the method includes updating the target schema according to a delta list.

Additionally and/or alternatively, each vertex type and/or each edge type can be associated with a global unique integer identifier. The global unique integer identifier can thus be correlated with name and/or any other attributes of the vertex type and/or the edge type, for example, via an index (not shown). Advantageously, by using the global unique integer identifier, each vertex type and/or each edge type can be represented in a simplified form in the data structure 160 to reduce consumption of time, memory space, and computation resources. As shown in FIG. 13, the data structure 160 can include such global unique integer identifier.

FIG. 13 illustrates implementation of 1120 of the method 1100. A delta list 142 is extracted, at 1122, from the schema change job 400. The delta list 142 can be extracted using any suitable methods. For example, the interpreter 260 (shown in FIG. 2) can parse the schema change job 400 to obtain information of changes specified in the schema change job 400. The information of changes can collectively form the delta list 142 that is based on the current version of the target schema 140.

The target schema 140 is updated, at 1124, according to the delta list 142. For example, the delta list 142 can be appended to the current target schema 140. Using the current target schema 140 as the base version, changes specified in the delta list 142 can be applied to the current target schema 140. The changes can be extracted from "List<VertexTypeDelta> VersionedVertexTypeDelta" and "List<EdgeTypeDelta> VersionedEdgeTypeDelta" associated with the version number of the current target schema 140. Updating of the target schema 140 can generate the updated target schema 150.

Optionally, a version number of the updated target schema 150 can be incremented, at 1126. In other words, the updated target schema 150 can be associated with a new version number. The new version number can be the base version number (or the version number of the target schema 140) increased by one.

Additionally and/or alternatively, prior to updating the target schema 140, at 1124, the target schema 140 can be backed up to a selected storage device. An exemplary storage device can include an external and/or internal drive. Advantageously, in the event that updating fails and/or need to be cancelled, the target schema 140 with no updates is not lost and can be retrieved.

Additionally and/or alternatively, prior to updating the target schema 140 at 1124, the delta list 142 can be semantically checked. The semantic check can advantageously ensure that the changes in the delta list 142 do not violate any referential integrity. Referential integrity can include correctness and/or validity of referential relation assumed in the changes. In certain examples, the system 300 (shown in FIG. 3) can implement the semantic check. When any referential integrity is violated, the system 300 can report a semantic error to the operator.

In one example, for a newly added edge, the semantic check can verify whether the FROM vertex type and/or the TO vertex type exist either in the current target schema 140 or in the new vertex types added to the VertexTypeDelta list.

In another example, for a to-be dropped vertex type and/or to-be dropped edge type, the semantic check can verify whether the vertex type and/or the edge type exist in the current target schema 140.

In yet another example, to add attribute(s) to a vertex type and/or edge type, the semantic check can verify whether the targeted vertex type and/or edge type exist in the current target schema 140.

In yet another example, to drop attribute(s) of a vertex type and/or edge type, the semantic check can verify whether the target attributes and vertex/edge type exist in the current target schema 140.

Based on the updated target schema 150, the source data 220 previously loaded into the graph model 100 can be updated. For example, the system 300 can update the previously-loaded source data 220. The source data 220 can be updated and/or stored in a predetermined binary format to advantageously reduce time and computation resources consumed during updating.

In one embodiment, the source data 220, upon being updated, can overwrite the previously loaded source data 220. Additionally and/or alternatively, prior to being overwritten, the previously-loaded source data 220 can be backed up to the selected storage device. Advantageously, in the event that updating fails and/or need to be cancelled, the previously-loaded source data 220 are not lost and can be retrieved.

The source data 220 can be updated in a manner depending on the specific change in the delta list 142. In one example, to add a new vertex type, the source data 220 can be unaffected except addition of the new vertex type.

In another example, to add a new edge type, the source data 220 can be unaffected except addition of the new edge type.

In yet another example, to drop a vertex type, the vertex type can be removed. Additionally and/or alternatively, attributes of the vertex type can be removed.

In yet another example, to drop an edge type, the edge type can be removed. Additionally and/or alternatively, attributes of the edge type can be removed. Additionally and/or alternatively, a "cascade" option can be included in the statement for dropping the edge type in the schema change job 400. The "cascade" option can allow FROM vertex type and/or TO vertex type corresponding to the edge type to be dropped.

Additionally and/or alternatively, when the FROM vertex type and/or TO vertex type correspond to another edge type, such FROM vertex type and/or TO vertex type are not dropped even if the "cascade" option is selected. A message can indicate such an error message or notification to the operator to indicate that the "cascade" option may not be implemented or may only be partially implemented.

In yet another example, to drop an attribute for existing vertex type and/or edge type, existing attributes can be scanned in order to find the attribute to be dropped. Upon finding the attribute, the attribute can be removed.

In yet another example, to add an attribute for existing vertex type and/or edge type, the attributes can be stored with the new attribute included. Optionally, the attributes can be re-packed in an array in any manner for storage. Value of the new attribute can include any predetermined default values as a placeholder. In the event that new source data 220 are loaded, the default values can be updated using the newly-loaded source data 220.

Additionally and/or alternatively, a graph query 510 (shown in FIG. 15) and/or a loading job 200 (shown in FIG. 2) previously generated based on the source data 220 can be validated after updating of the source data 220. In other words, prior to updating of the source data 220, the graph query 510 and/or the loading job 200 can be generated. However, certain results of such graph query 510 and/or the loading job 200 may no longer be valid with respect to the updated source data 220.

In one example, the graph query 510 can be invalid if the graph query 510 extracts information on a vertex type and/or edge type that is to be dropped according to the schema change job 400. In another example, a loading job 200 can be invalid if attributes of the vertex type and/or the edge type are changed (for example, added and/or dropped) according to the schema change job 400. Therefore, existing queries and/or loading jobs 200 can be validated. When a query and/or loading job 200 is affected, the system 300 can report the no-longer valid query and/or the loading job 200 to the operator to request updating of the graph query 510 and/or the loading job 200. For example, the system 300 can request re-run the graph query 510 and/or the loading job 200 on the updated source data 220.

Figure 14:
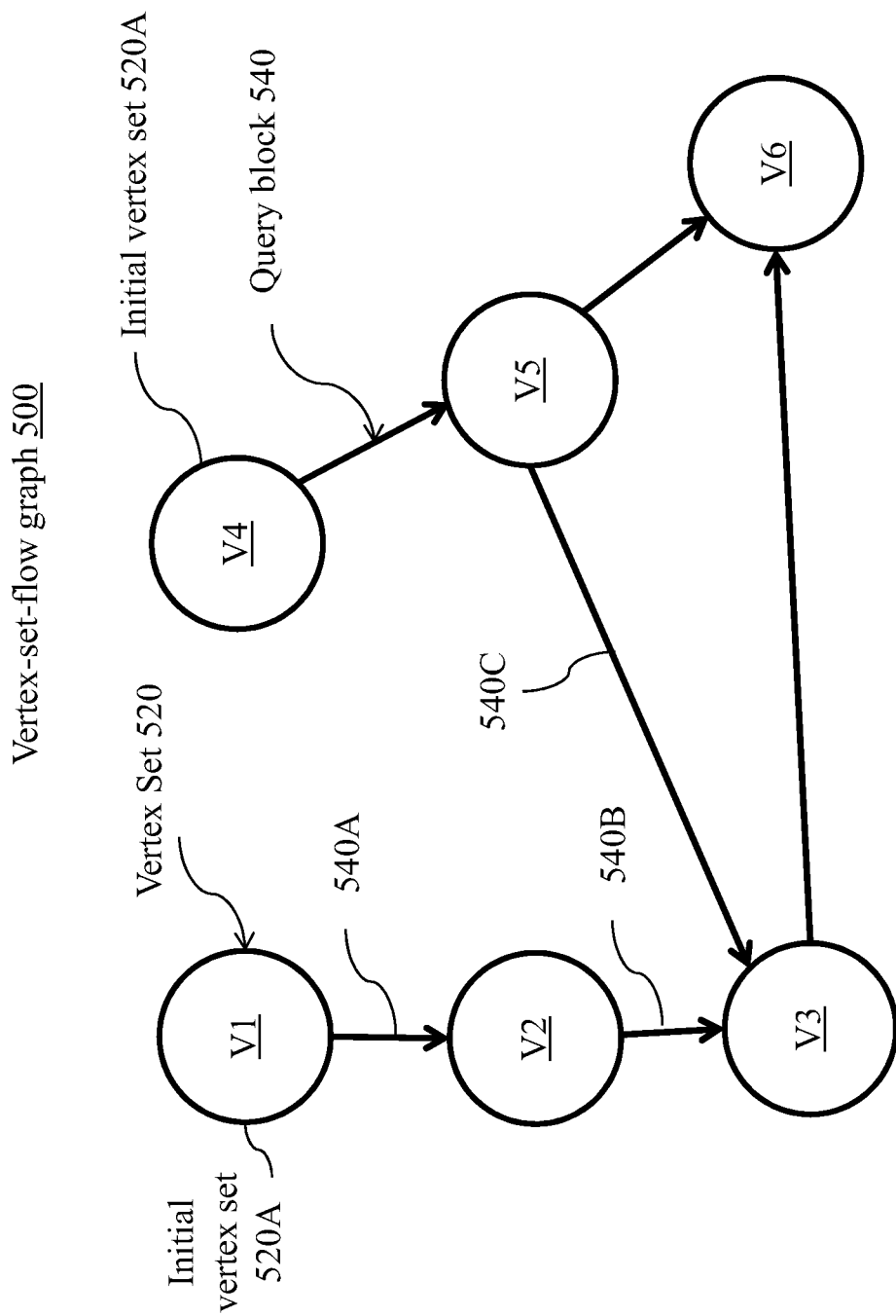
FIG. 14 is an exemplary diagram illustrating an embodiment of a vertex-set-flow graph for querying the graph model of FIG. 1.

Various embodiments are disclosed herein to illustrate querying the graph model 100 (shown in FIG. 1). Turning to FIG. 14, for example, a vertex-set-flow graph 500 is shown.

The vertex-set-flow graph 500 can include a plurality of vertex sets 520. For illustrative purposes, FIG. 14 shows the vertex sets 520 as including V1, V2, . . . , V6. Each vertex set 520 can form a node in the vertex-set-flow graph 500.

The vertex sets 520 can be inter-connected in a directional manner as indicated by arrows shown in FIG. 14. The arrows can represent query blocks 540, respectively. Each query block 540 can include one or more graph query instructions (not shown) to process an input vertex set to produce an output vertex set. An arrow corresponding to a query block 540 can point from the input vertex set of the query block 540 to the output vertex set of the query block 540. For example, in FIG. 14, the vertex sets V1, V2 are respectively the input vertex set and the output vertex set of the query block 540A. The vertex sets V2, V3 are respectively the input vertex set and the output vertex set of the query block 540B. The vertex sets V5, V3 are respectively the input vertex set and the output vertex set of the query block 540C.

Thus, the vertex-set-flow graph 500 shown in FIG. 14 illustrates a flow from a selected vertex set 520 to another vertex set 520. The flow can be consistent with interdependent relationship among a plurality of query blocks 540. FIG. 14 shows the vertex-set-flow graph 500 as being a Directed Acyclic Graph (DAG). In other words, the vertex-set-flow graph 500 can include a directed graph with no directed cycles that start and end at the same node. For example, the arrows in the vertex-set-flow graph 500 do not necessarily form a directed cycle.

As shown in FIG. 14, the vertex set 520 can include at least one initial vertex set 520A (shown as V1 and/or V4 in FIG. 14). The flow illustrated by the arrows in the vertex-set-flow graph 500 can start from the initial vertex set 520A.

Figure 15:
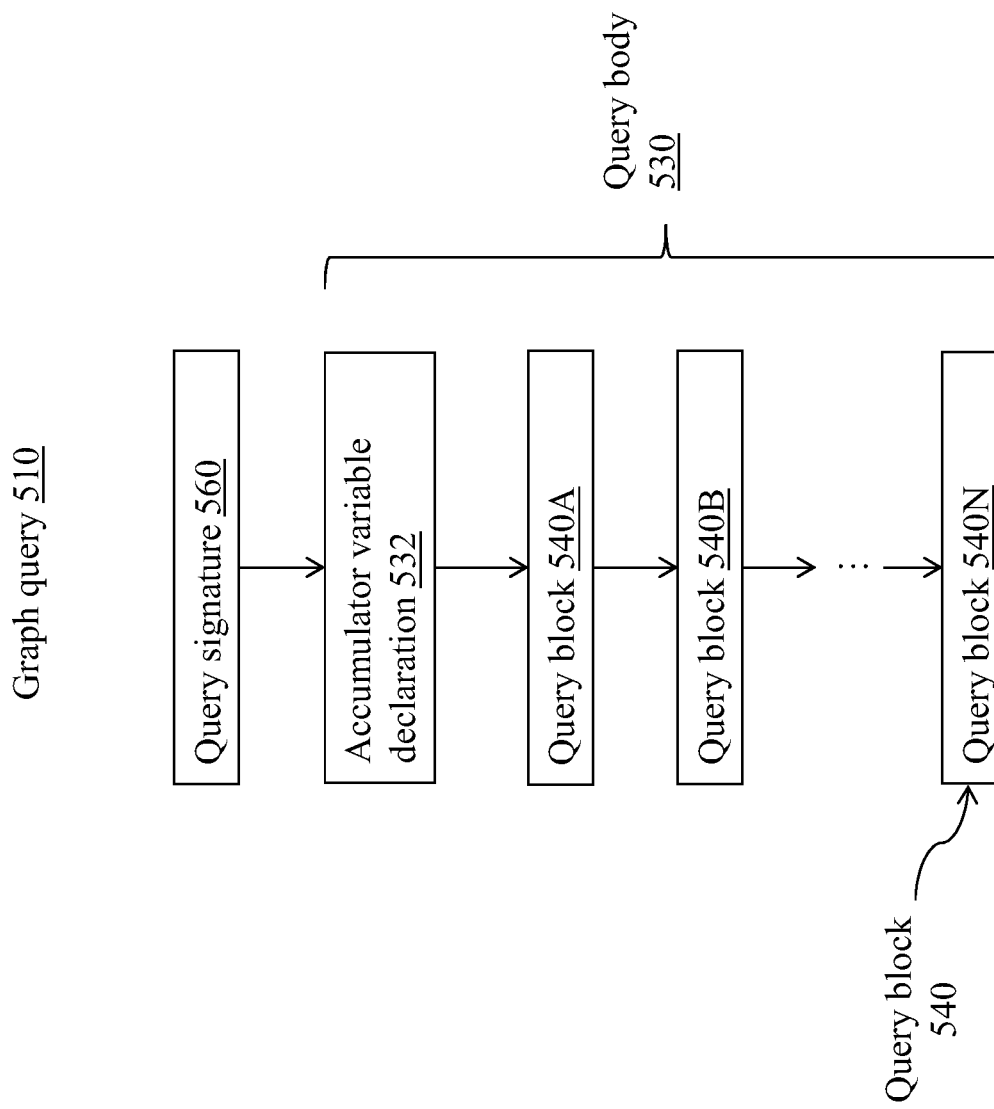
FIG. 15 is an exemplary block diagram illustrating an embodiment of a graph query for querying the graph model of FIG. 1.

Turning to FIG. 15, an embodiment of a graph query 510 is shown. An exemplary graph query 510 can be defined by the operator via a user interface (not shown) provided by the system 300 (shown in FIG. 3). The user interface can include graphical user interface and/or a declarative language having predetermined syntax.

The graph query 510 can include a query body 530. The query body 530 can include a plurality of query blocks 540A-540N listed sequentially. For example, the query blocks 540A-540N can be listed in a sequence at least partially consistent with flow of the vertex sets 520 (shown in FIG. 14). Stated somewhat differently, an input vertex set of a query block 540 can be an output vertex set of an immediately-previous query block 540. For example, an input vertex set of the query block 540B can be an output vertex set of the query block 540A.

Optionally, the query body 530 can include a runtime attribute declaration 532. The runtime attributes declaration 532 can include a declaration (and/or definition) of one or more runtime attributes (shown in Table 18-1) of the graph query 510.

The runtime attribute declaration 532 can be located anywhere in the query body 530. Preferably, as shown in FIG. 15, the exemplary runtime attribute declaration 532 is located at a beginning of the query body 530. Advantageously, when the query body 530 is interpreted and/or executed sequentially, information presented in the runtime attribute declaration 532 can be obtained first and be used for interpreting and/or executing the query blocks 540A-540N.

Optionally, the graph query 510 can include a query signature 560 for identifying the graph query 510 and/or providing query parameters (not shown) to be used in the query body 530. An exemplary query signature 560 can include a query name of the graph query 510 and/or a name of the graph model 100 (shown in FIG. 1) on which the graph query 510 is based.

The query signature 560 can be located anywhere in the graph query 510. Preferably, as shown in FIG. 15, the exemplary query signature 560 is located at a beginning of the graph query 510. Advantageously, when the graph query 510 is interpreted and/or executed sequentially, information presented in the query signature 560 can be obtained first and be used for interpreting and/or executing the query body 530.

Table 14-1 shows an exemplary template of the graph query 510 in the declarative language. In various exemplary templates of the graph query 510 as disclosed in the present disclosure, keywords are shown in all uppercase to be distinguished from user-defined identifiers.

TABLE 14-1

| Line | Instruction |
|---|---|
| 1 | # Query Signature |
| 2 | CREATE QUERY q_name (parameter_list) FOR GRAPH g_name |
| 3 | { |
| 4 | # Runtime attribute declaration |
| 5 | # Query Blocks |
| 6 | } |

Table 14-2 shows an example of the query signature 560 in the declarative language.

TABLE 14-2

| Line | Instruction |
|---|---|
| 1 | CREATE QUERY Demo (vertex<user> seed, float threshold=0.5) FOR GRAPH |
| 2 | recommend { body } |

As shown in Table 14-2, "demo" is the name of the graph query 510. "Seed" is a vertex that belongs to a vertex type "user." "Threshold" is a query parameter of "float" format. A default value of "threshold" is set to be 0.5. Thus, "threshold" is set to be 0.5 unless execution of the graph query 510 generates a value for "threshold" different from 0.5. "Recommend" is the name of the graph model 100.

Table 14-3 shows an exemplary template of the query body 530 in the declarative language.

TABLE 14-3

| Line | Instruction |
|---|---|
| 1 | #Query_Block_i refers to previous query block result set in its |
| 2 | FROM clause |
| 3 | T_0 = Query_Block_i; |
| 4 | #Query_Block_j refers to previous query block result in its |
| 5 | FROM clause |
| 6 | T_1 = Query_Block_j; |
| 7 |  |
| 8 | . |
| 9 | . |
| 10 | . |
| 11 | T_n = Query_Block_k; |
| 12 | #can print final result to a file or REST call response object. |
| 13 | Print Statement |

In Table 14-3, each query block 540 can be associated with a name, shown to be T_0, T_1 . . . T_n. The name of the query block 540 can represent the output vertex set of the query block 540. For illustrative purposes, Table 14-3 shows the name of the query block 540 as being located to the left of the equal sign.

Each query block 540 can refer to a result of at least one of the previous query blocks 540. In other words, an input vertex of a query block 540 can be an output vertex set of at least one of the previous query blocks 540. As shown in Table 14-3, T_1 is the output vertex set of query_block_j. T_0 is the output vertex set of query_block_i and the input vertex set of query_block_j.

Figure 16:
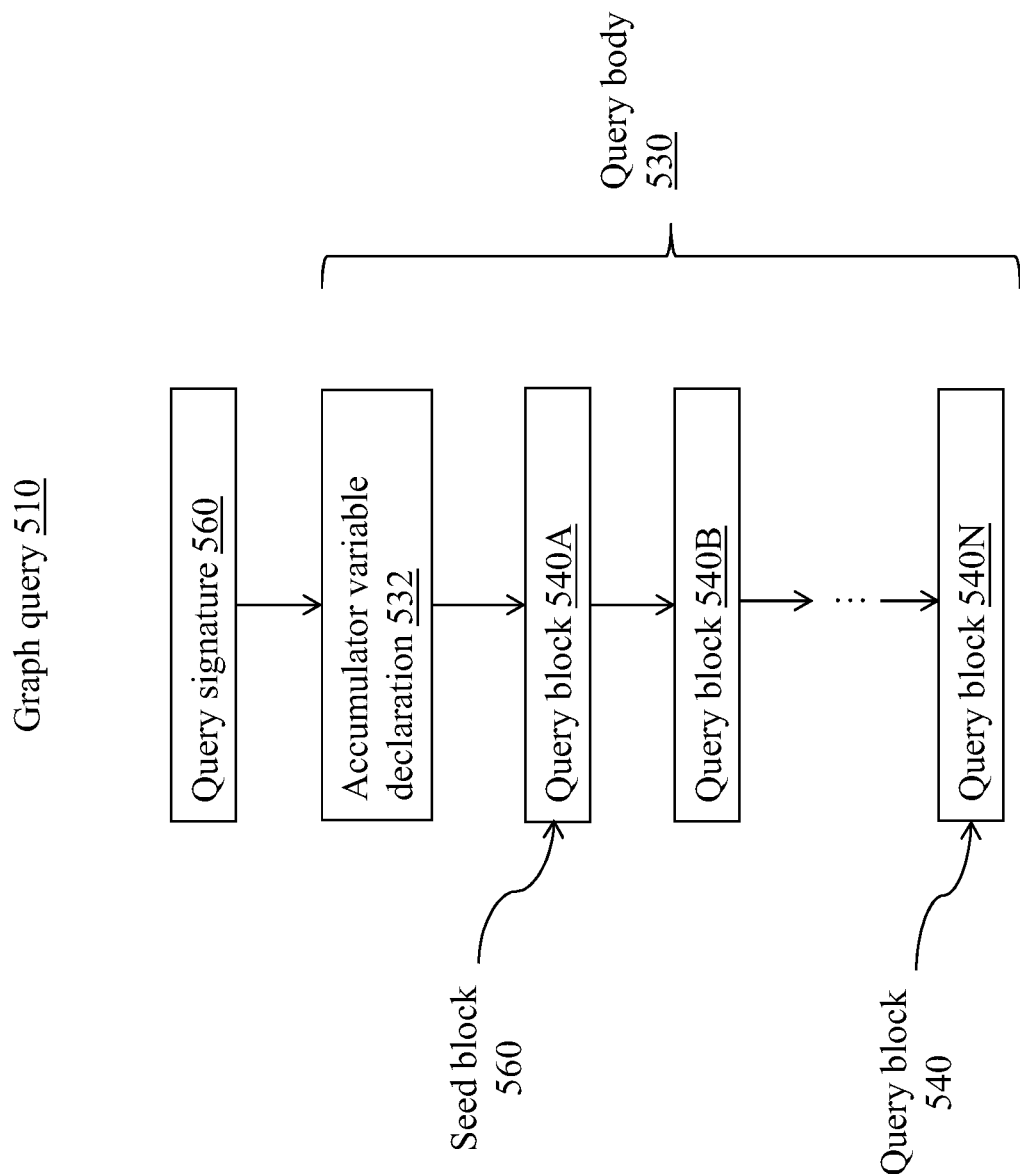
FIG. 16 is an exemplary block diagram illustrating an alternative embodiment of the graph query of FIG. 15, wherein the graph query includes a seed block.

Turning to FIG. 16, at least one query block 540 can be a seed block 560. For example, the query block 540A can be the seed block 560. That is, a first query block 540 can be the seed block 560. The seed block 560 can define the initial vertex set 520A (shown in FIG. 14) without necessarily performing computation. For example, the seed block 560 can define the initial vertex set 520A based on the target schema 140 (shown in FIG. 10) of the graph model 100 (shown in FIG. 10). Defining the initial vertex set 520A can include activating all vertices 110 (shown in FIG. 1) of the initial vertex set 520A to be used in the graph query 510.

Table 15 shows three exemplary seed blocks 560 in the declarative language.

TABLE 15

| Line | Instruction |
|---|---|
| 1 | //we can activate all vertices of one or more vertex types using |
| 2 | "vertexTypeName.*" |
| 3 | S = {user.*}; |
| 4 | //to activate two vertex types |
| 5 | S = {user.*, product.*}; |
| 6 | //or any vertex type |
| 7 | S = {any}; |

In lines 1-3 of Table 15, the seed block 560 can define the initial vertex set 520 as including all vertices 110 of the vertex type "user." In lines 4-5, the seed block 560 can define the initial vertex set 520A as including all vertices 110 of the vertex type "user" and all vertices 110 of the vertex type "product". In lines 6-7, the seed block 560 can define the initial vertex set 520A as including all vertices 110 of the graph model 100.

Although FIG. 16 shows the graph query 510 as including one seed block 560 for illustrative purposes only, the graph query 510 can include any number of uniform and/or different seed blocks 560 without limitation.

Figure 17:
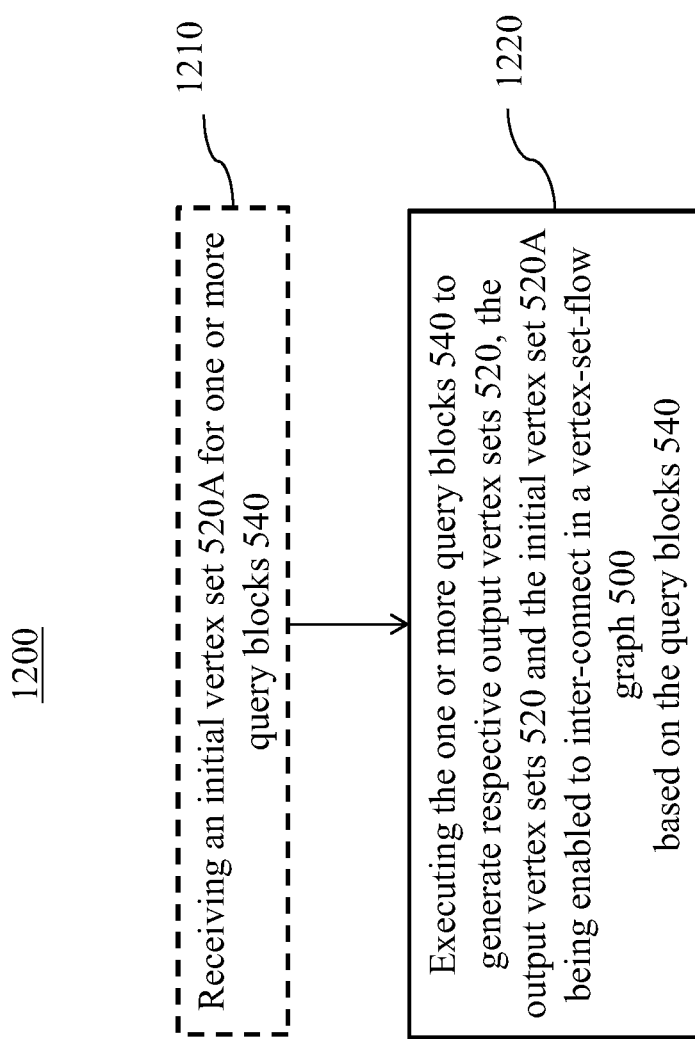
FIG. 17 is an exemplary flow chart illustrating an embodiment of a method for querying the graph model of FIG. 1.

Turning to FIG. 17, an embodiment of a method 1200 is shown for querying the graph model 100 (shown in FIG. 1). Optionally, an initial vertex set 520A can be received, at 1210, for one or more query blocks 540. For example, the initial vertex set 520A can be obtained via the seed block 560 (shown in FIG. 16). The initial vertex set 520A can be the input vertex to be inputted to at least one of the query blocks 540.

The one or more query blocks 540 are executed, at 1220, to generate respective output vertex sets 520. The output vertex sets 520 and/or the initial vertex set 520A can be enabled to inter-connect in the vertex-set-flow graph 500 based on the query blocks 540.

The method 1200 can provide significantly improved functions for graph data query. For example, without using the method 1200, graph processing platforms either in C, C++ or Java language only provide very low level application programming interfaces (APIs) as an interface to support user in writing queries. Even if a graph database management system provides a declarative language to query graph database, functions are significantly limited and far from meeting most of the real-life graph query needs. The method 1200 provides a DAG-based query structure. Such a structure can offer great flexibility and power for the query; so, the query can be capable of performing various functions to meet real-life graph query needs.

Figure 18:
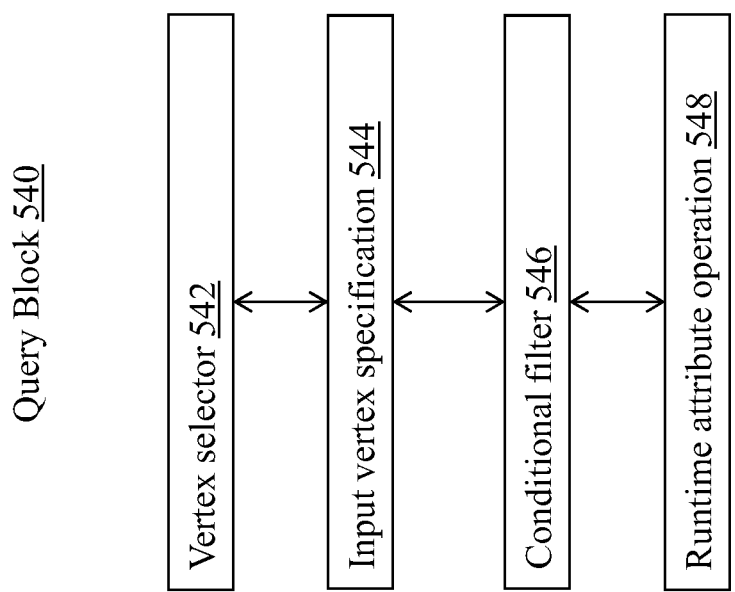
FIG. 18 is an exemplary block diagram illustrating an embodiment of a query block of the graph query of FIG. 15.

Turning to FIG. 18, an exemplary structure of an embodiment of the query block 540 is shown. The query block 540 can include a vertex block for producing an output vertex set that can be a subset of an input vertex set. Table 17-1 shows a template of an exemplary vertex block in the declarative language.

TABLE 17-1

| Line | Instruction |
|---|---|
| 1 | T= SELECT v |
| 2 | FROM fromVertexSet:v |
| 3 | WHERE condition |
| 4 | ACCUM statement_list |
| 5 | POST-ACCUM statement_list |
| 6 | HAVING condition |
| 7 | ORDER BY expression_list |
| 8 | LIMIT k; |

Additionally and/or alternatively, the query block 540 can include an edge block. In certain examples, the edge block can start from one vertex set 520, traverse one step over a set of edges 120 (shown in FIG. 1) in the graph model 100 (shown in FIG. 1) connected to the vertex set 520, and reach another vertex set 520. Table 17-2 shows a template of an exemplary edge block in the declarative language.

TABLE 17-2

| Line | Instruction |
|---|---|
| 1 | T= SELECT v |
| 2 | FROM fromVertexSet:src – ((edgeType1\|edgeType2...\|edgeTypeN):e) |
| 3 | -> (vertexType1\|vertexType2...\|vertexTypeN):v |
| 4 | WHERE condition |
| 5 | ACCUM statement_list |
| 6 | POST-ACCUM statement_list |
| 7 | HAVING condition |
| 8 | ORDER BY expression_list |
| 9 | LIMIT k; |

As shown in FIG. 18, the query block 540 can include a vertex selector 542. The vertex selector 542 can include a clause that declares an identifier of the output vertex set of the query block 540. For example, the vertex selector 542 can include a SELECT clause in Table 17-1 and Table 17-2. That is, a vertex set 520 (shown in FIG. 14) produced in the query block 540 and associated with the identifier can be selected to be the output vertex set. The identifier can include a name of the vertex set 520. Additionally and/or alternatively, the identifier can include an alias (or secondary name or nickname) of the vertex set 520. When the alias is shorter than the name, using the alias can advantageously be more convenient than using the name. In Table 17-1 and Table 17-2, the identifier is represented by "v," which can be replaced by any other predetermined text string.

The query block 540 can include an input vertex specification 544. The input vertex specification 544 can include a clause for specifying the input vertex set of the query block 540. For example, the input vertex specification 544 can include a FROM clause in Table 17-1 and Table 17-2.

In the vertex block shown in Table 17-1, the input vertex set specified in the FROM clause is a vertex set represented by a name "fromVertexSet" and/or an alias "v."

In the edge block Table 17-2, the input vertex set specified in the FROM clause is a vertex set represented by a name "fromVertexSet" and/or an alias "src." In the edge block, the FROM clause can specify an edge connected to the input vertex set. For example, the FROM clause can have the form of an edge template "fromVertexSet:src-((edgeType1|edgeType2 . . . |edgeTypeN):e)→(vertexType1|vertexType2 . . . |vertexTypeN):tgt."

The edge template can include three parts, including a source end, a list of wanted edge types, and a list of targeted vertex types. The starting part "fromVertexSet:src" specifies the name and/or alias of the input vertex set. The ending part "vertexType1|vertexType2 . . . |vertexTypeN):tgt" can be the name of each targeted vertex type and/or alias assigned to the targeted vertex type. Different (or adjacent) vertex types can be separated by a vertical bar, for example. As shown in Table 17-2, the list of the vertex types can be enclosed within a pair of parenthesis followed by an optional colon with an alias.

The middle part "((edgeType1|edgeType2 . . . |edgeTypeN):e)" is the name of each targeted edge type. Different (or adjacent) edge types can be separated by a bar. As shown in Table 17-2, the list of the edge types can be enclosed by a pair of parentheses followed by a colon with an alias. The middle part can be enclosed in a pair of parenthesis. A dash "-" and/or an arrow "→" can be used for separating the three parts.

The vertex selector 542 and the input vertex specification 544 can be inter-related. For example, for the vertex block, the vertex selector 542 can declare the identifier of the output vertex set based on the input vertex set specified in the input vertex specification 544. As shown in Table 17-1, the SELECT clause can select the vertex set 520 referenced in the FROM clause. For the edge block, the vertex selector 542 can declare the identifier of the output vertex set based on the input vertex set and/or the target vertex set.

The output vertex set declared in the vertex selector 542 can be assigned a user-specified globally unique name. For example, an exemplary user-specified globally unique name is represented by "T" in Table 17-1 and Table 17-2. One or more successive query blocks 540 can refer to the output vertex set by using the user-specified globally unique name.

Additionally and/or alternatively, the query block 540 can include a conditional filter 546. An exemplary conditional filter 546 can include a WHERE clause. As shown in Table 17-1 and Table 17-2, the WHERE clause can specify a "condition" expression. The "condition" expression can be evaluated for each vertex 110 and/or each edge 120 encompassed in the input vertex specification 544. If the condition is evaluated to be "false," the vertex 110 and/or the edge 120 can be excluded from further consideration in the query block 540.

The "condition" expression can use query constants, query variables, and/or query parameters effective within the query block 540, arithmetic operators (for example, +, -, *, /), comparison operators (for example, ==, !=, <, <=, >, >=), Boolean operators (for example, AND, OR, NOT), set operators (for example IN, NOT IN), and/or parentheses for enforcing precedence.

The query variable effective within the query block 540 can be in the form of a constant. Additionally and/or alternatively, the query variable can be in the form of "v.name," where "v" can include any identifier in the FROM clause (for example, name and/or alias of a vertex type and/or an edge type name or alias), and "name" can include an attribute of "v" based on the graph model 100. Additionally and/or alternatively, "name" can include a runtime attribute.

Additionally and/or alternatively, an exemplary conditional filter 546 can include a HAVING clause. As shown in Table 17-1 and Table 17-2, the HAVING clause can specify a "condition" expression. The "condition" expression in the HAVING clause can be in a similar manner as the "condition" expression in the WHERE clause. However, in certain examples, the "condition" expression in the HAVING clause can perform filtering based on computation result from a runtime attribute operation 548. Additionally and/or alternatively, in the edge block, the "condition" expression in the HAVING clause does not process attribute of an edge 120.

Additionally and/or alternatively, the query block 540 can include a block output rule (not shown). The block output rule can include one or more requirements for presenting result of the query block 540. An exemplary block output rule can include a LIMIT clause. As shown in Table 17-1 and Table 17-2, the LIMIT clause can specify a number "k" of vertices 110 to be presented as result of the query block 540.

Additionally and/or alternatively, an exemplary block output rule can include an ORDER BY clause. The query block 540 can select the top k vertices 110 in an order (or sequence) based on the criterion in "expression list" provided in the ORDER BY clause. Optionally, when the query block 540 does not include the ORDER BY clause, the top k vertices 110 can be selected in any predetermined manner.

Additionally and/or alternatively, the query block 540 can include a runtime attribute operation 548 for performing calculation and/or other processes based on one or more runtime attributes. An exemplary runtime attribute operation 548 can perform aggregation calculation for the runtime attributes across one or more vertices 110 and/or one or more edges 120 in one or more iterations. Advantageously, the runtime attribute operation 548 can permit flexible and power calculations for facilitating complex graph queries.

An exemplary runtime attribute operation 548 can include an ACCUM clause for processing one or more selected runtime attributes. As shown in Table 17-1 and Table 17-2, the ACCUM clause can specify a statement list. The statement list can include one or more statements each specifying a computation process based on a runtime attribute.

Additionally and/or alternatively, an exemplary runtime attribute operation 548 can include a POST-ACCUM clause for processing one or more selected runtime attributes that are updated in the ACCUM clause. As shown in Table 17-1 and Table 17-2, the POST-ACCUM clause can specify a statement list. The statement list can include one or more statements each specifying processing based on a runtime attribute. In certain examples, the ACCUM clause can perform a first-stage operation for the runtime attributes, and the POST-ACCUM clause can offer a second-stage operation based on a result of the first-stage operation.

Although various clauses shown in Table 17-1 and 17-2 are described sequentially in the present disclosure for illustrative purposes only, the sequence of such clauses are not limited in any manner. Preferably, the clauses follow a sequence of SELECT →FROM →WHERE →ACCUM →POST-ACCUM →HAVING →ORDER BY →LIMIT. Advantageously, information of one clause can be used by subsequent clauses, and interpreting of the query block 540 can be simplified.

An exemplary runtime attribute can include an accumulator (or mutable state variable). The accumulator can be attached to, or otherwise associated with, a vertex 110 (shown in FIG. 1) in the graph query 510 for the duration of the graph query 510. For example, the accumulator can be attached to each vertex 110 in the graph query 510 for the duration of the graph query 510. An exemplary accumulator can support various aggregation operations.

The graph query 510 can be configured to recognize and process various built-in accumulators each having respective characteristics regarding type of data to be stored, how the data are stored, and/or the built-in behavior of the aggregation operations. In other words, definition and/or function of certain accumulators can be pre-defined so an operator can write the graph query 510 to include the accumulators for achieving respective functions of the accumulators.

Table 18-1 shows exemplary accumulators that can be built-in for the graph query 510.

TABLE 18-1

| ACCUMULATOR | DEFAULT INITIAL VALUE | ACCUMULATE FUNCTION (RESULT OF +=) |
| --- | --- | --- |
| MINACCUM<INT> | INT_MAX (SYSTEM DEPENDENT) | THE LESSER OF PREVIOUS AND NEW_VALUE |
| MINACCUM<FLOAT> | LONG_MAX (SYSTEM DEPENDENT) | THE LESSER OF PREVIOUS AND NEW_VALUE |
| MAXACCUM<INT> | INT_MIN (SYSTEM DEPENDENT) | THE GREATER OF PREVIOUS AND NEW_VALUE |
| MAXACCUM<FLOAT> | LONG_MIN (SYSTEM DEPENDENT) | THE GREATER OF PREVIOUS AND NEW_VALUE |
| SUMACCUM<STRING> | EMPTY STRING | STRING CONCATENATION OF PREVIOUS AND |
| SUMACCUM<INT> | 0 | PREVIOUS VALUE OF ACCUM_VAR+ |
| SUMACCUM<FLOAT> | 0.0 | PREVIOUS VALUE OF ACCUM_VAR+ |
| ORACCUM | FALSE | BOOLEAN OR PREVIOUS VALUE AND |
| ANDACCUM | TRUE | BOOLEAN AND OF PREVIOUS VALUE AND |
| AVGACCUM | 0.0 | AVERAGE OF THE SET OF PREVIOUS AND NEW_VALUE |
| GROUPBYACCUM | AGGREGATES HAVE THEIR OWN INITIAL VALUES | ACCUMULATE TO GROUP BY ACCUMULATOR LIST |
| LISTACCUM<TYPE> | LIST OF INITIAL VALUES of TYPE | APPEND NEW ELEMENT TO THE LIST |
| MAPACCUM<KEY,VAL> | AN EMPTY MAP | UPDATE (OR INSERT) KEY-VALUE PAIR |
| SETACCUM<TYPE> | AN EMPTY SET | INSERT ELEMENT TO THE SET IF IT DOES NOT |

An exemplary accumulator can be a local accumulator. For example, the local accumulator can be declared with a "@" prefix. The local accumulator can be attached (and/or associated) with a specific vertex 110. Each vertex 110 can have respective accumulation value. Stated somewhat differently, a local accumulator can include an array of accumulators corresponding to an array of vertices 110. For example, if a local accumulator @A is declared and fifty vertices 110 are selected in the query block 540 in the vertex set 520 named "myVertex," the fifty vertices 110 can have respective local accumulators "myVertex.@A," with respective individual state values for the local accumulators. In one embodiment, the local accumulator can remain attached with respective vertex throughout a graph query 510, that is, until the end of the last query block 540 in the graph query 510.

Additionally and/or alternatively, an exemplary accumulator can be a global accumulator. For example, the global accumulator can be declared with a "@@" prefix. The global accumulator is not necessarily attached with a specific vertex 110. In one embodiment, the global accumulator can apply to all vertices 110 in the graph query 510.

An exemplary runtime attribute can be declared via the runtime attribute declaration 532 (shown in FIG. 16). Table 18-2 shows a template of exemplary runtime attribute declarations 532 in the declarative language.

TABLE 18-2

| Line | Instruction |
| --- | --- |
| 1 | /* Vertex Accumulator Variable, prefixed by @ */ AccumType<Type> |
| 2 | @acc_name; |
| 3 | /* Global Accumulator Variable prefixed by @@ */ |
| 4 | AccumType<Type> @@gacc_name; |

In lines 1-2 of Table 18-2, declaration of a local accumulator is shown. In lines 3-4, declaration of a global accumulator is shown. The name "AccumType" can include a name of a specific type of accumulator for performing a predetermined function. The term "<Type>" can indicate type of data that the accumulator processes. Exemplary types of data can include integer (indicated by <int>), floating point number (indicated by <float>), string (indicated by <string>), or a combination thereof.

For example, to compute an average of floating point values, the AccumType<Type> can be AvgAccum<float>. The name "acc_name" can include a user-defined name of the specific accumulator.

Table 18-3 shows an exemplary runtime attribute declaration 532 in the declarative language. For illustrative purposes, the type of accumulator is show as being SumAccum (as listed in Table 18-1).

TABLE 18-3

| Line | Instruction |
| --- | --- |
| 1 | # this is a global variable |
| 2 | SumAccum<int> @@Gcnt; |
| 3 | # this is a local variable, attachable to each vertex in the |
| 4 | query. |
| 5 | SumAccum<int> @Vcnt; |

The accumulator can perform aggregation operation by using one or more aggregation operators. An exemplary aggregation operator can include an "+=" operator to accumulate values into the accumulator. The "+=" operator can update value of the accumulator by performing addition on numeric data and/or concatenation on string data. For example, if @@intSum is a SumAccum<int> accumulator, then @@intSum +=5 can add a value of five to the value of intSum. If @@stringSum is a SumAccum<string> accumulator, then @@stringSum +="er" can append "er" to the value of stringSum.

Additionally and/or alternatively, exemplary aggregation operator can include an "=" operator to set/reset the value of the accumulator.

An initial value of the runtime attribute can be declared via the runtime attribute declaration 532. The initial value can include a specified value and/or default value. An exemplary default value can be 0 (for a number), and/or empty string (for a string).

For example, the accumulator can have an initial value (or initial state). The initial value of an accumulator can be declared in the runtime attribute declaration 532. For example, the operator can use the "=" operation to explicitly assign an initial state when declaring the accumulator. For example, a "SumAccum<int> @A=3;" can assign a value of three as the initial value of accumulator @A.

Table 18-4 shows an exemplary graph query 510. For illustrative purposes, the type of accumulator is show as being SumAccum.

TABLE 18-4

| Line | Instruction |
|---|---|
| 1 | #   count how many users are connected to a given v. SumAccum<int> |
| 2 | @cnt = 0; |
| 3 | #   if a product connects to at least one user, set its flag to 1. |
| 4 | SumAccum<int> @flag = 0; |
| 5 | #   if a product connects to at least one user, set its flag to 1. |
| 6 | X = SELECT v |
| 7 | |
| 8 | FROM User-(:e)->Product:v |
| 9 | ACCUM v.@cnt += 1, v.@flag = 1; |
| 10 | # print all attributes of v, including the attached accumulator |
| 11 | values. |
| 12 | PRINT X; |

Any other exemplary accumulators, for example, MinAccum<type> and/or MaxAccum<type>, can be used in a similar manner as SumAccum<type>.

As shown in Table 18-1, an exemplary accumulator can include a "groupby" accumulator, for example, named as "GroupByAccum." The "groupby" accumulator can be declared to include an expression list. The expression list can include one or more expressions for specifying respective group dimensions to group and/or aggregate edges 120, vertices 110, attributes, and/or other result generated during querying. A group dimension can be a criterion for classifying vertices 110 into groups. Each group can thus be uniquely identified by the expression list.

Additionally and/or alternatively, the groupby accumulator can be declared to include one or more accumulators to aggregate for each group.

For example, in the form of "AccumType<Type>," the groupby accumulator can be represented as "GroupByAccum<expr1, expr2 . . . accum1, accum2 . . . >."

Table 18-5 shows an exemplary graph query 510 using GroupByAccum.

TABLE 18-5

| Line | Instruction |
|---|---|
| 1 | //below int is age type, string is gender type, MaxAccum<double> |
| 2 | is the accumulator type to store max salary. MinAccum<int> is the |
| 3 | accumulator type to store minimum work_years. |
| 4 | |
| 5 | GroupByAccum<int, string, MaxAccum<double>, MinAccum<int>> |

TABLE 18-5-continued

| Line | Instruction |
|---|---|
| 6 | @@Result; |
| 7 | |
| 8 | //then, we can use one seed block, one vertex block to do the |
| 9 | groupby |
| 10 | S = {User.*}; |
| 11 | |
| 12 | T = SELECT v |
| 13 | FROM S:v |
| 14 | ACCUM @@Result += (v.age, v.gender, v.salary, v.work_years); |

In Table 18-5, a "user" vertex type can have attributes including age, gender, salary, and work_years. The GroupByAccum in the graph query 510 can group all vertices 110 of the "user" vertex type by age and gender, and can find, for each group, a maximum value of salary attribute and a minimum of work_years attribute.

Figure 19:
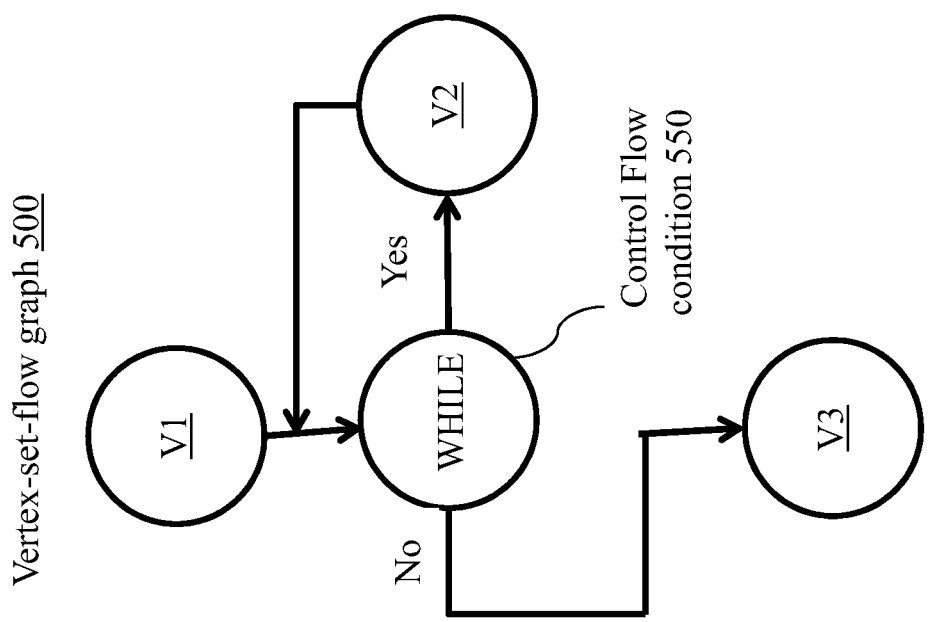
FIG. 19 is an exemplary diagram illustrating an alternative embodiment of the vertex-set-flow graph of FIG. 14, wherein the vertex-set-flow graph includes a WHILE loop.

Turning to FIG. 19, an exemplary graph of an alternative embodiment of the vertex-set-flow graph 500 is shown. The vertex-set-flow graph 500 indicates the graph query 510 (shown in FIG. 15) as being executed based on control flow (or flow-control, or flow of control). The control flow can include a control of sequence of the query blocks 540. For example, the control of sequence can be based on a control flow condition 550.

FIG. 19 shows the vertex-set-flow graph 500 as including a WHILE loop. The WHILE loop can be based on the control flow condition 550. For example, the graph query 510 can include a WHILE clause for specifying the control flow condition 550.

For example, the graph query 510 can loop a sequence of one or more query blocks 540 to iteratively execute the sequence. FIG. 19 shows the sequence of one or more query blocks 540 as including vertex set V2. As shown in FIG. 19, the looping can stop when the control flow condition 550 is no longer met. Additionally and/or alternatively, the looping can stop when the control flow condition 550 is met.

Table 19-1 shows an exemplary template of a graph query 510 using the WHILE loop.

TABLE 19-1

| Line | Instruction |
|---|---|
| 1 | T_0 = Query_Block_i |
| 2 | WHILE (condition) limit maxIteration |
| 3 | { |
| 4 | # Query_Block_j must refer to the previous query block before |
| 5 | the WHILE loop |
| 6 | T_1 = Query_Block_j; |
| 7 | # Query_Block_2 must refer to a vertex set name before its |
| 8 | syntax position. |
| 9 | T_2 = Query_Block_k; |
| 10 | |
| 11 | . |
| 12 | . |
| 13 | . |
| 14 | # Query_Block_m must refer to previous query block result set in |
| 15 | the FROM clause |
| 16 | T_n = Query_Block_m; |
| 17 | } |

Figure 20:
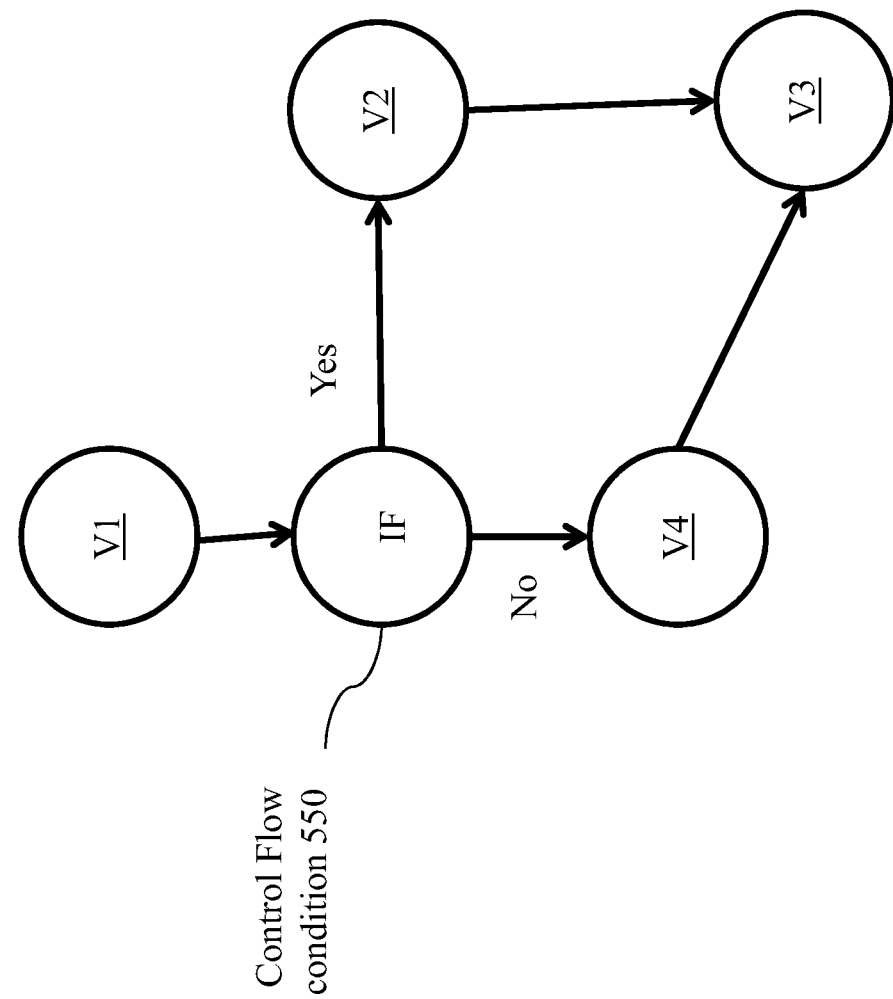
FIG. 20 is an exemplary diagram illustrating another alternative embodiment of the vertex-set-flow graph of FIG. 14, wherein the vertex-set-flow graph includes IF-ELSE control flow.

Turning to FIG. 20, the vertex-set-flow graph 500 is shown as including IF-ELSE control flow. The IF-ELSE control flow can be based on one or more control flow conditions 560. For example, the graph query 510 can include an IF clause, and ELSE clause, and/or an ELSE IF clause for specifying the control flow condition 550. FIG. 19 shows that the vertex set V2 is generated when the control flow condition 550 is met, and the vertex set V4 is generated when the control flow condition 550 is not met.

Table 19-2 shows an exemplary template of a graph query 510 using the IF-ELSE control flow.

TABLE 19-2

| Line | Instruction |
|---|---|
| 1 | CREATE QUERY Driver (int qnumber, vertex seed) FOR GRAPH Demo |
| 2 | { |
| 3 |    IF (condition1) |
| 4 |    { |
| 5 |       Start = Query_Block_i; |
| 6 |       X= ...; |
| 7 |    } ELSE IF (condition2) |
| 8 |    { |
| 9 |       Start = Query_Block_j; |
| 10 |       X= ...; |
| 11 |    } ELSE { |
| 12 |       Start = Query_Block_k; |
| 13 |       X= ...; |
| 14 |    } |
| 15 | } |

By using the IF-ELSE control flow, capability of the graph query 510 can advantageously be greatly enhanced. As shown Table 19-2, lines 5-6, lines 9-10, and lines 12-13 can each form a sub-query. Each sub-query can include a respective seed block 560 (shown in FIG. 16). Thus, even with one query signature 560 (shown in FIG. 15), a user can have multiple sub-queries in one query body 530 (shown in FIG. 15).

Figure 21:
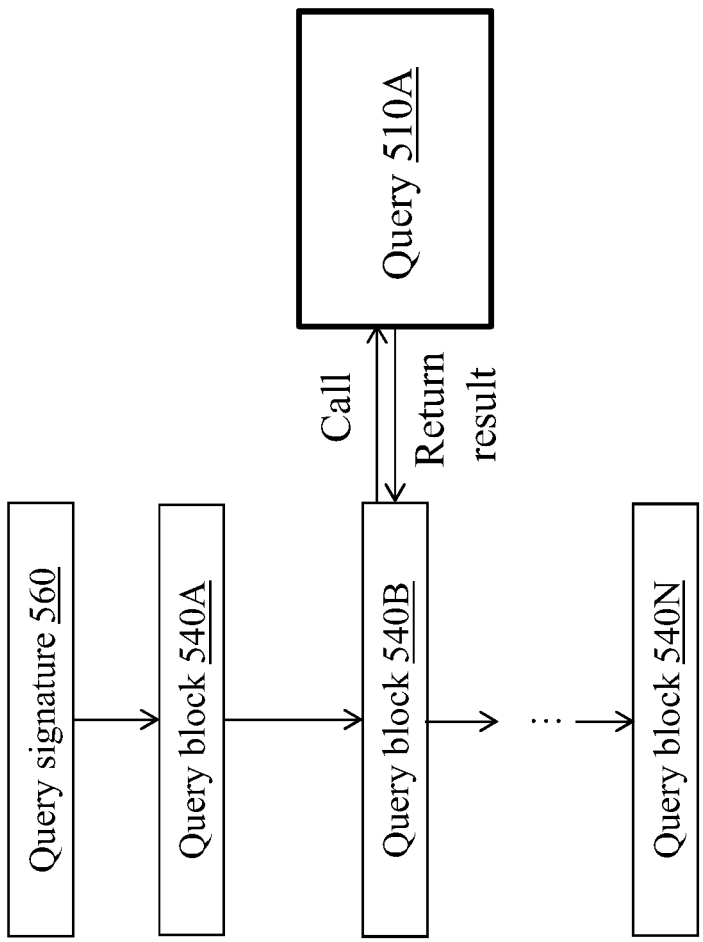
FIG. 21 is an exemplary block diagram illustrating another alternative embodiment of the graph query of FIG. 15, wherein the graph query calls another graph query.

Turning to FIG. 21, the query block 540B of the graph query 510 is shown as calling a graph query 510A. Stated somewhat differently, the graph query 510 can have a query-calling-query feature. For example, the graph query 510A can be pre-composed as a generic function in a modulized manner. The graph query 510 can call such a generic function.

As shown in FIG. 21, the query block 540B can receive a return result from the graph query 510A. For example, the query block 540B can return a vertex set 520 (shown in FIG. 14).

The return result can include one or more query results. For example, to return a plurality of values, the graph query 510A can define a plurality of return types. The graph query 510 can use respective host variables to receive the values.

Table 20-1 shows exemplary graph query 510A (lines 1-7) and graph query 510 (lines 8-12) using the query-calling-query feature.

TABLE 20-1

| Line | Instruction |
|---|---|
| 1 | CREATE QUERY Neighbors (vertex<user> u)FOR GRAPH |
| 2 | demo:Set<vertex<user>> { |
| 3 |    Start = {u}; |
| 4 |    Result = SELECT v |
| 5 |       FROM Start-(related:e)->user:v; |
| 6 |    RETURN Result; |
| 7 | } |
| 8 | CREATE QUERY Driver(vertex<user> u) FOR GRAPH demo{ |
| 9 |    L0 = Neighbors(u); |
| 10 |    L1 = SELECT v |
| 11 |       FROM L0-(relate:e)->user:v; |
| 12 | } |

As shown in lines 1-7 of Table 20-1, the query "Neighbors" can return a vertex set "v" containing users that are neighbors of the vertex "u" of the vertex type "user." As shown in lines 8-12 of Table 20-1, the query "Driver" can call the query "Neighbors" to find all neighbors of the vertex "u." In line 9, the query "Driver" can assign an alias L0 (as the host variable) to all neighbors of the vertex "u."

As shown in line 2 of the query signature (lines 1-2), a return type (or type of return data) of the query "Neighbors" can be specified following a colon. The return type in line 2 is "Set<vertex<user>>." The query "Driver" can receive the return result of the specified return type.

Table 20-2 shows exemplary graph query 510A (lines 1-7) and graph query 510 (lines 8-13) using the query-calling-query feature.

TABLE 20-2

| Line | Instruction |
|---|---|
| 1 | CREATE QUERY Neighbors (vertex<user>u) FOR GRAPH demo: |
| 2 | (Set<vertex<user>>, int){ |
| 3 |    Start = {u}; |
| 4 |    Result = SELECT v |
| 5 |       FROM Start-(related:e)->user:v; |
| 6 |    RETURN (Result, Result.size( )); |
| 7 | } |
| 8 | CREATE QUERY Driver(vertex<user>u) FOR GRAPH demo{ |
| 9 |    int size; |
| 10 |    (L0,size) = Neighbors(u); |
| 11 |    L1 = SELECT v |
| 12 |       FROM L0-(relate:e)->user:v; |
| 13 | } |

As shown in Table 20-2, the return result of the query "Neighbors" can include two values of return types "Set<vertex<user>>" and "int," respectively. The query "Driver" can use host variables "L0" and "size" to receive the two values, respectively.

The query "Driver," or the calling query in Table 20-2, can receive return result from the query "Neighbors." The return result can include the neighbors of the vertex "u" as "L0" and total neighbor count as "size."

Figure 22:
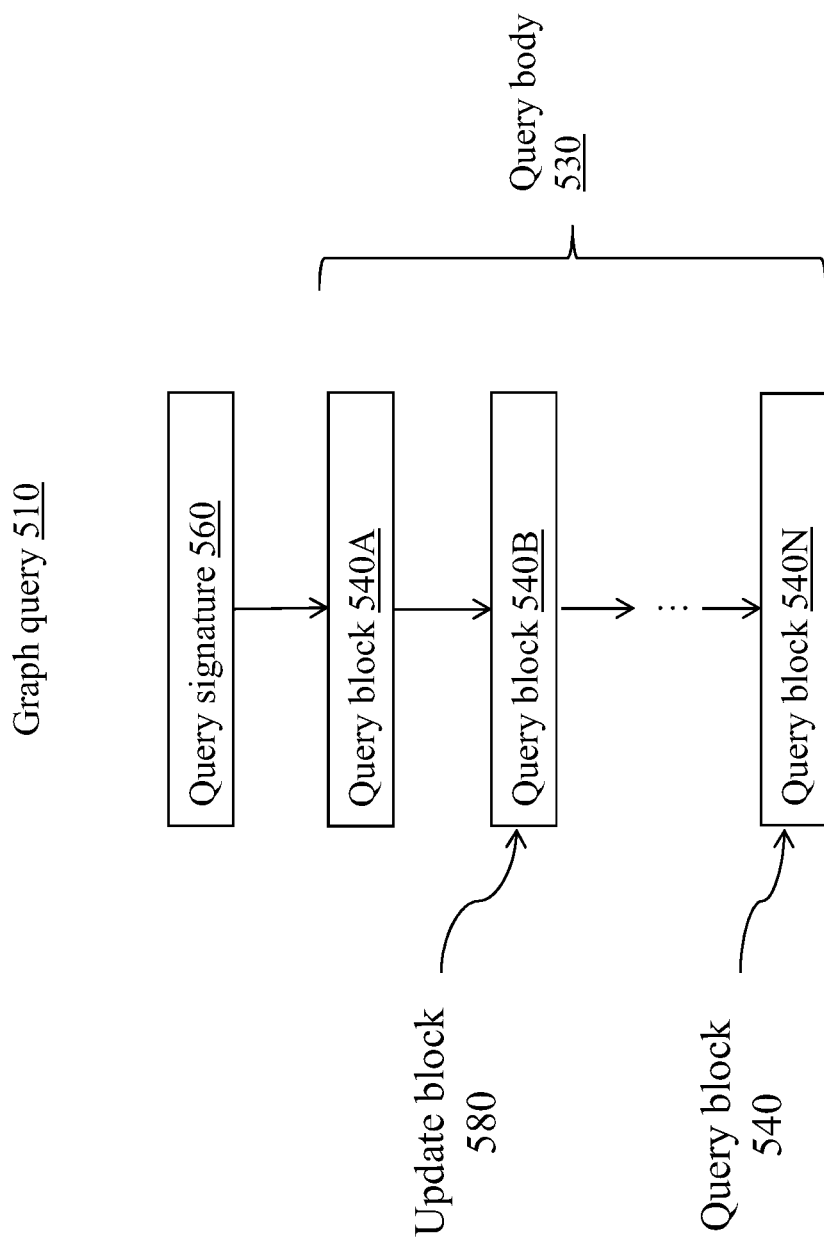
FIG. 22 is an exemplary block diagram illustrating another alternative embodiment of the graph query of FIG. 15, wherein the graph query includes an update block.

Turning to FIG. 22, the graph query 510 is shown as including an update block 580. The update block 580 can be used for explicitly updating a vertex set 520 (shown in FIG. 14) as the graph query 510 traverses the vertex-set-flow graph 500 (shown in FIG. 14).

Table 21-1 shows an exemplary template of the update block 580.

TABLE 21-1

| Line | Instruction |
|---|---|
| 1 | UPDATE verteSetName |
| 2 | WHERE condition |
| 3 | SET assignment List |

The SET clause in Table 21-1 can include an assignment list to update one or more vertex sets 520. The vertex sets 520 can be specified in the UPDATE clause. The WHERE clause can be used for filtering the vertex sets 520 using the condition.

Table 21-2 shows an exemplary update block 580.

TABLE 21-2

| Line | Instruction |
|---|---|
| 1 | UPDATE X |
| 2 | WHERE X.name == "abc" |
| 3 | SET X.name = "efg", X.age = 34; |

As shown in Table 21-2, the update block 580 can use the UPDATE clause to specify a vertex set X, use the condition in the WHERE clause to filter the vertex set X, and use the SET clause to update a list of attributes of the remaining X. The updates can include changing value of "name" attribute from "abc" to "efg," and set value of "age" attribute to a value of thirty-four.

Table 21-3 shows another exemplary update block 580.

TABLE 21-3

| Line | Instruction |
|---|---|
| 1 | X = SELECT v |
| 2 | FROM src-(:e)->:v |
| 3 | ACCUM v.@cnt +=1; |
| 4 | #update clause |
| 5 | UPDATE VERTEX X |
| 6 | WHERE X.age >10 AND X.@cnt >10 |
| 7 | SET X.name = X.@name + "abc"; |

As shown in Table 21-3, the update block 580 can use the UPDATE clause to specify the vertex set X, use the condition in the WHERE clause to filter the vertex set X, and use the SET clause to update a list of attributes of the remaining vertex set X. The update can include adding a string "abc" to value of "name" attribute of the remaining vertex set X.

Thus, the update block 580 can dynamically update the vertex set 520 as the graph query 510 traverses the vertex-set-flow graph 500. Exemplary updating can include changing attributes of the vertex set 520, inserting and/or deleting the vertex set 520, or a combination thereof.

Additionally and/or alternatively, the update block 580 can dynamically update a set of edges 120 (shown in FIG. 1) involved in the query block 540 as the graph query 510 traverses the vertex-set-flow graph 500. Exemplary updating can include changing attributes of the edges 120, inserting and/or deleting and/or edges 120 involved in the query block 540, or a combination thereof.

The updating can include calculation and/or otherwise processing the vertex-set-flow graph 500, while keeping the graph model 100 (shown in FIG. 1) and schema of the graph model 100 unaffected. Because the updating can be implemented midway during the graph query 510, flexibility and capability of the graph query 510 can advantageously be greatly enhanced.

Figure 23:
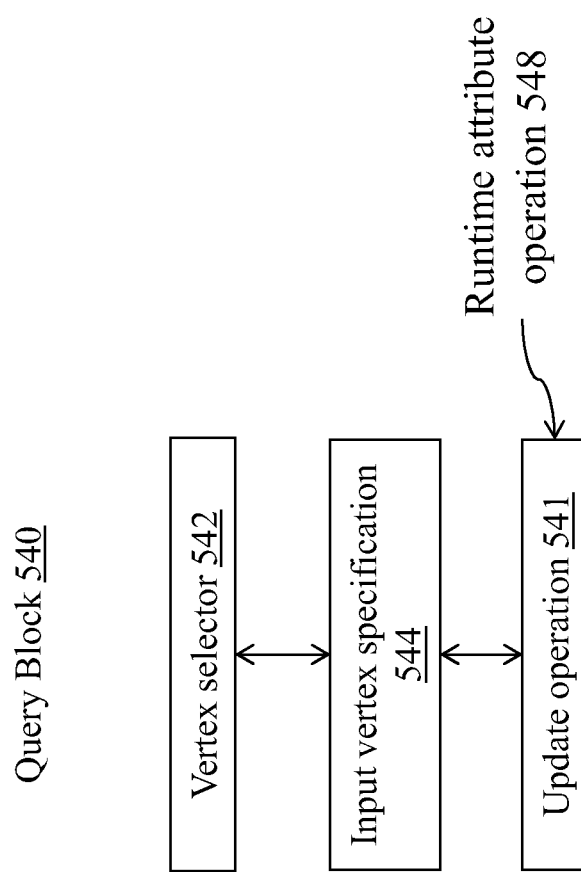
FIG. 23 is an exemplary block diagram illustrating an alternative embodiment of the query block of FIG. 18, wherein the query block comprises an update operation.

Turning to FIG. 23, the runtime attribute operation 548 is shown as including an update operation 541. The update operation 541 can be used for updating a vertex set 520 (shown in FIG. 14) as the graph query 510 traverses the vertex-set-flow graph 500 (shown in FIG. 14). Because the update operation 541 can achieve the updating without using the update block 580 (shown in FIG. 22), the updating using the update operation 541 can be implicit.

For example, the update operation 541 can use the ACCUM clause of the runtime attribute operation 548 for updating. Additionally and/or alternatively, the WHERE clause in the query Block 540 can perform filtering on the vertex set 520 prior to the updating.

Table 21-4 shows an exemplary update operation 541 in a vertex block.

TABLE 21-4

| Line | Instruction |
|---|---|
| 1 | Y = SELECT src |
| 2 | FROM X:src |
| 3 | WHERE src.work_year >3 |
| 4 | #update salary attribute by multiplying it by 1.1 |
| 5 | ACCUM src.salary = src.salary*1.1; |

Table 21-5 shows an exemplary update operation 541 in an edge block.

TABLE 21-5

| Line | Instruction |
|---|---|
| 1 | Y = SELECT v |
| 2 | FROM X:src-(:e)->:v |
| 3 | WHERE src.work_year >3 |
| 4 | #update work_period attribute of edge by incrementing 1. |
| 5 | ACCUM e.work_period = e.work_period +1; |

Additionally and/or alternatively, the query block 540 can include one or more set operations (not shown) using respective set operators. The set operations can be applied to one or more names (that is, output vertex sets) of respective previous query blocks 540. Exemplary set operators can include UNION, INTERSECT, and/or MINUS operators.

Table 22 shows exemplary set operations applied to the query blocks 540.

TABLE 22

| Line | Instruction |
|---|---|
| 1 | T3 = T1 UNION T2; |
| 2 | T4 = T3 MINUS T5; |

In Table 22, T3 is the union of T1 output vertex set and T2 output vertex set. T4 can be equal to a difference calculated by T3 minus T5.

Table 23 shows an exemplary template of the graph query 510 (shown in FIG. 15).

TABLE 23

| Line | Instruction |
|---|---|
| 1 | CREATE QUERY q_name (parameter_list) FOR GRAPH g_name |
| 2 | { |
| 3 | # global accumulators |
| 4 | AccumType<Type> @@gacc_0; |
| 5 | . |
| 6 | . |
| 7 | . |
| 8 | AccumType<Type> @@gacc_i; |
| 9 | # vertex accumulators |
| 10 | AccumType<Type> @acc_0; |
| 11 | . |
| 12 | . |
| 13 | . |
| 14 | AccumType<Type> @acc_i; |
| 15 | # query block sequence starts |
| 16 | T_0 = Query_Block_0; |
| 17 | T_1 = Query_Block_1; |
| 18 | . |
| 19 | . |
| 20 | . |
| 21 | #IF-ELSE |

TABLE 23-continued

| Line | Instruction |
|------|-------------|
| 22 | IF (condition) { |
| 23 |    T_3 = Query_Block_3; |
| 24 | } ELSE IF (condition){ |
| 25 |    T_4 = Query_Block_4; |
| 26 | } ELSE { |
| 27 |    T_5 = Query_Block_5; |
| 28 | } |
| 29 | #WHILE loop |
| 30 | WHILE (condition) limit maxIteration |
| 31 | { |
| 32 |    T_6 = Query_Block_6; |
| 33 |    . |
| 34 |    . |
| 35 |    . |
| 36 |    #query block name set operation |
| 37 |    T_7 = T5 minus T6; |
| 38 | } |
| 39 | |
| 40 | #calling another query with T6 as parameter |
| 41 | T_8 = q_name2(T6); |
| 42 | |
| 43 | #output T8 |
| 44 | PRINT T_8; |
| 45 | } |

The template shown in Table 23 can be used for writing the graph query 510 that combines a predetermined combination of the features shown in FIGS. 14-23. Such features can be applied collectively and/or individually in the graph query 510.

Various embodiments are now shown as following to further illustrate the disclosed features of the graph query 510 for querying an exemplary graph model 100 (shown in FIG. 10) having a target schema 140 (shown in FIG. 10). The exemplary graph model 100 can denote company, employee, and relationships therebetween.

Table 24-1 shows exemplary definition of the target schema 140.

TABLE 24-1

| Line | Instruction |
|------|-------------|
| 1 | CREATE VERTEX company(PRIMARY_ID companyId string, |
| 2 | id string, company_name string default "unknown") |
| 3 | CREATE VERTEX employee(PRIMARY_ID employeeId string, |
| 4 | id string, industry_id int default 0) |
| 5 | CREATE VERTEX skill(PRIMARY_ID skillId uint, id string) |
| 6 | CREATE UNDIRECTED EDGE employee_work_company |
| 7 | (FROM employee, TO company, titleId int, industryId string, startTime int) |
| 8 | CREATE DIRECTED EDGE employee_has_skill(FROM employee, TO skill) |
| 9 | CREATE GRAPH company_employee(company, employee, skill, |
| 10 | employee work company, employee has skill) |

Table 24-2 shows an exemplary graph query 510 that uses runtime attributes of the target schema 140.

TABLE 24-2

| Line | Instruction |
|------|-------------|
| 1 | CREATE QUERY employee_count (string c) FOR GRAPH company_employee |
| 2 | { |
| 3 |    SumAccum<int> @@cnt = 0; |
| 4 |    SumAccum<int> @skillCnt = 0; |
| 5 |    Start = {employee.*}; |
| 6 | |
| 7 |    Emp = SELECT Start |

TABLE 24-2-continued

| Line | Instruction |
|------|-------------|
| 8 |    FROM Start-(employee_has_skill:e)->skill:v |
| 9 |    ACCUM Start.@skillCnt +=1 |
| 10 |    HAVING Start.@skillCnt >=3; |
| 11 |    Result = SELECT v |
| 12 |    FROM Emp-(employee_work_company:e)->company:v |
| 13 |    WHERE v.company_name == c |
| 14 |    ACCUM @@cnt += 1; |
| 15 |    PRINT @@cnt; |
| 16 | } |

In Table 24-2, the graph query 510 can count number of employees that have three or more skills and work for company "c."

The graph query 510 starts by activating all employees. An edge block "Emp" is used to select employees each having more than three skills via a runtime attribute @skillCnt. The resultant output vertex set is assigned to a vertex set "Emp."

The graph query 510 starts from the vertex set "Emp" set to traverse the edge "employee_work_company" to select employees who work for company c. The count of the edge "employee_work_company" can be summed in a global accumulator @@cnt, and print out the count by a PRINT statement.

Table 24-3 shows an exemplary graph query 510 that uses GroupBy accumulator.

TABLE 24-3

| Line | Instruction |
|------|-------------|
| 1 | CREATE QUERY GroupBy( ) FOR GRAPH company_employee |
| 2 | { |
| 3 |    GroupByAccum<string, SumAccum<int>> @@groupByCompany; |
| 4 |    GroupByAccum<int, SumAccum<int>> @@groupByIndustryId; |
| 5 | |
| 6 |    Start = {employee.*}; |
| 7 |    Emp = SELECT c |
| 8 |    FROM Start-(employee_work_company:e)->company:c |
| 9 |    ACCUM @@groupByCompany += (c.company_name, 1), |
| 10 |       @@groupByIndusstryId += (Start.industry_id, 1); |
| 11 |    PRINT @@groupByCompany; |
| 12 |    PRINT @@groupByIndustryId; |
| 13 | } |

In Table 24-3, the graph query 510 can compute how many employees work for a company, and how many employees work for an industry represented by industry_id. That is, the graph query 510 can group the employees by company_name and/or by industry_id respectively using the GroupBy accumulator.

Table 24-3 shows the graph query 510 as declaring two global GroupBy accumulators. One GroupBy accumulator can group the employees by company_name. The other GroupBy accumulators can group the employees by industry_id. Both GroupBy accumulators can be calculated within one edge block.

In traditional relational database, even if a "GroupBy" functionality is available, only one expression list can be used. In contrast, according to the disclosed embodiments, with capability of supporting multiple GroupBy accumulators each corresponding to an expression list, the graph query 510 can advantageously simplify query structure and make querying more efficient and convenient.

Table 24-4 shows an exemplary graph query 510 that uses a WHILE loop.

TABLE 24-4

| Line | Instruction |
|---|---|
| 1 | CREATE QUERY test ( ) FOR GRAPH company_employee |
| 2 | { |
| 3 | SumAccum<int> @skillCnt = 0; |
| 4 | SumAccm<int> @@cnt = 3; |
| 5 | Start = {employee.*}; |
| 6 | WHILE (@@cnt > 0) |
| 7 | { |
| 8 | Result = SELECT v |
| 9 | FROM Start-(employee_has_skill:e)->skill:v |
| 10 | ACCUM Start.@skillCnt +=1 |
| 11 | HAVING Start.@skillCnt == @@cnt; |
| 12 | PRINT Result; |
| 13 | |
| 14 | Start = Start minus Result; |
| 15 | @@cnt = @@cnt − 1; |
| 16 | } |
| 17 | } |

In Table 24-4, the graph query 510 can print out employees who have three skills, two skills, and one skill respectively. The graph query 510 can use the WHILE loop to select any employees who have three skills in a first round of executing the WHILE loop, select any employees who have two skills in a second round of the WHILE loop, and select any employees who have one skill in a last round of the WHILE loop.

Table 24-5 shows an exemplary graph query 510 that uses IF-ELSE control flow.

TABLE 24-5

| Line | Instruction |
|---|---|
| 1 | CREATE QUERY employee2 (bool hasMoreSkill) FOR GRAPH |
| 2 | company_employee |
| 3 | { |
| 4 | SumAccum<int> @@cnt = 0; |
| 5 | SumAccum<int> @skillCnt = 0; |
| 6 | Start = {employee.*}; |
| 7 | IF (hasMoreSkill) |
| 8 | { |
| 9 | Emp1 = SELECT Start |
| 10 | FROM Start-(employee_has_skill:e)->skill:v |
| 11 | ACCUM Start.@skillCnt +=1 |
| 12 | HAVING Start.@skillCnt >=3; |
| 13 | } ELSE { |
| 14 | |
| 15 | Emp1 = SELECT Start |
| 16 | FROM Start-(employee_work_company:e)->company:v |
| 17 | WHERE v.company_name == c; |
| 18 | } |
| 19 | PRINT Emp1; |
| 20 | } |

In Table 24-5, the graph query 510 can use the IF-ELSE control flow to determine whether to query the employees who have three or more skills or who work for company "c." Depending on whether the query parameter "hasMoreSkill" is true or not, the graph query 510 can call two different edge blocks. As shown in Table 24-5, when the query parameter "hasMoreSkill" is true, the graph query 510 can query the employees who have three or more skills. When the query parameter "hasMoreSkill" is not true, the graph query 510 can query the employees who work for company "c."

Table 24-6 shows an exemplary graph query 510 that uses the query-calling-query feature.

TABLE 24-6

| Line | Instruction |
|---|---|
| 1 | CREATE QUERY EmpHasSkill (string s) FOR GRAPH company_employee: |
| 2 | VERTEX<employee> |
| 3 | { |
| 4 | Start = {employee.*}; |
| 5 | |
| 6 | Emp = SELECT Start |
| 7 | FROM Start-(employee_has_skill:e)->skill:v |
| 8 | WHERE v.id == s; |
| 9 | RETURN Emp; |
| 10 | } |
| 11 | |
| 12 | CREATE QUERY Emp (string A, string B) FOR GRAPH company_employee |
| 13 | { |
| 14 | EmpA = EmpHasSkill(A); |
| 15 | EmpB = EmpHasSkill(B); |
| 16 | Result = EmpA intersect EmpB; |
| 17 | PRINT Result; |
| 18 | } |

In Table 24-6, a query "EmpHasSkill" can be defined to find all employees having a specific skill "s." Then, a query "Emp" can be used to find employees who have both skill A and skill B. Table 24-6 shows the query "Emp" as calling the query "EmpHasSkill" twice, for skill A and skill B, respectively.

Table 24-7 shows an exemplary graph query 510 "changeName" that includes the update block 580 (shown in FIG. 22).

TABLE 24-7

| Line | Instruction |
|---|---|
| 1 | CREATE QUERY changeName (string c, string d) FOR GRAPH |
| 2 | company employee { |
| 3 | Start = {company.*}; |
| 4 | |
| 5 | UPDATE START |
| 6 | WHERE START.company_name == c |
| 7 | SET s.company_name = d; |
| 8 | } |

In lines 5-6 of Table 24-7, the update block can change the attribute company_name from "c" to "d."

Table 24-8 shows the exemplary graph query 510 "changeName" for implicitly updating by a vertex block.

TABLE 24-8

| Line | Instruction |
|---|---|
| 1 | CREATE QUERY changeName (string c, string d) FOR GRAPH |
| 2 | company_employee |
| 3 | { |
| 4 | Start = {company.*}; |
| 5 | |
| 6 | Result = SELECT s |
| 7 | FROM Start:s |
| 8 | WHERE START.company_name == c |
| 9 | ACCUM s.company_name = d; |
| 10 | } |

In line 9 of Table 24-8, the ACCUM clause can change the attribute "company_name" from "c" to "d."

Table 24-9 shows the exemplary graph query 510 "employee2" that can form the vertex-set-flow graph 500 (shown in FIG. 14) having a DAG shape.

TABLE 24-9

| Line | Instruction |
| --- | --- |
| 1 | CREATE QUERY employee2 (string c) FOR GRAPH company_employee |
| 2 | { |
| 3 |     SumAccum<int> @@cnt = 0; |
| 4 |     SumAccum<int> @skillCnt = 0; |
| 5 |     Start = {employee.*}; |
| 6 | |
| 7 |     Emp1 = SELECT Start |
| 8 |         FROM Start-(employee_has_skill:e)->skill:v |
| 9 |         ACCUM Start.@skillCnt +=1 |
| 10 |         HAVING Start.@skillCnt >=3; |
| 11 |     Emp2 = SELECT Start |
| 12 |         FROM Start-(employee_work_company:e)->company:v |
| 13 |         WHERE v.company_name == c; |
| 14 |     Result = Emp1 UNION Emp2 |
| 15 | |
| 16 |     PRINT Result; |
| 17 | } |

In line 9 of Table 24-9, the query "employee2" can find the employees that either have more than three skills or work for company "c." The query "employee2" assigns all employees to the seed block "Start." The edge block "Emp1" can store all employees having more than three skills. Starting from the seed block "Start," the edge block "Emp2" can store all employees who work for company "c." The result is equal to union of the edge blocks "Emp1", "Emp2." As shown in Table 24-9, from any previous query block 540, a one-step traversal on the vertex-set-flow graph 500 can produce an output vertex set mid-query (that is, midway during the graph query 510).

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for updating a schema of a graph database, comprising:
defining the schema of the graph database;
obtaining a schema change job for the schema;
running the schema change job to update the schema; and
updating data in the graph database based on the updated schema,
wherein the schema includes a plurality of vertex types, a plurality of edge types, or a combination thereof, and
wherein the schema change job specifies one or more changes for the schema including adding a new vertex type, adding a new edge type, dropping a vertex type of the vertex types, dropping an edge type of the edge types, adding a new attribute to a vertex type of the vertex types, adding a new attribute to an edge type of the edge types, dropping an attribute from a vertex type of the vertex types, dropping an attribute from an edge type of the edge types, or a combination thereof.

2. The method of claim 1, further comprising incrementing a version number of the updated schema.

3. The method of claim 1, wherein said running comprises:
extracting a delta list from the schema change job; and
updating the schema according to the delta list.

4. The method of claim 3, further comprising assigning a version number to the extracted delta list, the version number being associated with the schema, or wherein said extracting comprises generating the delta list based on the changes specified in the schema change job for the schema.

5. The method of claim 4, further comprising storing the delta list associated with each respective version number and maintaining a history of the -schema based upon the stored delta list.

6. The method of claim 3, further comprising semantically checking the delta list to avoid violating referential integrity with respect to the schema.

7. The method of claim 6, further comprising reporting an error upon identifying a violation of the referential integrity with respect to the schema,
wherein the schema change job specifies adding a new edge type to the schema, and wherein said semantically checking comprises verifying whether a FROM vertex type or a TO vertex type for the new edge type either exists in the schema or is a new vertex type to be added to the schema based on the delta list,
wherein the schema change job specifies dropping a vertex type or an edge type from the schema, and wherein said semantically checking comprises verifying whether the vertex type or the edge type exists in the schema,
wherein the schema change job specifies adding an attribute to a vertex type or an edge type, and wherein said semantically checking comprises verifying whether the vertex type or the edge type exists in the schema, or
wherein the schema change job specifies dropping an attribute of a vertex type or an edge type, and wherein said semantically checking comprises verifying whether the attribute, the vertex type or the edge type exist in the schema.

8. The method of claim 1, further comprising backing up the schema prior to said running the schema change job.

9. The method of claim 1, wherein the data includes source data loaded into the graph database before said running, and said updating comprises maintaining consistency between the updated data and the updated schema without reloading, after said running, the source data into the graph database.

10. The method of claim 1, wherein the schema change job specifies adding the new attribute to the vertex type or the edge type in the schema, and wherein said updating the data comprises:
scanning attributes of the vertex type, the edge type, or a combination thereof;
re-packing the attributes including the new attribute into a predetermined binary format; and
assigning a default value to the new attribute.

11. The method of claim 1, wherein the schema change job specifies dropping the attribute of the vertex type or the edge type in the schema, and wherein said updating the data comprises removing the data of the attribute.

12. The method of claim 1, wherein the schema change job specifies dropping the vertex type or the edge type from the schema, and wherein said updating the data comprises removing the data of the vertex type or the edge type.

13. The method of claim 12, wherein the schema change job specifies a cascade option for dropping the edge type, and wherein said updating the data further comprises dropping a FROM vertex type or a TO vertex type corresponding to the edge type based on the cascade option.

14. The method of claim 1, further comprising backing up the data prior to said updating, further comprising validating a graph query based on said updating for maintaining consistency between the validated graph query and the updated schema, or a combination thereof.

15. The method of claim 14, further comprising requesting an update to the graph query upon determining that the graph query is invalid based on said updating, or wherein said validating comprises reporting invalidity of the graph query upon determining that the graph query is based on a vertex type or an edge type that is dropped via said updating.

16. The method of claim 1, further comprising validating a loading job based on said updating for maintaining consistency between the validated loading job and the updated schema.

17. The method of claim 16, wherein said validating comprises reporting invalidity of the loading job upon determining that the loading job is configured to load source data into an attribute that is added or dropped via said updating.

18. The method of claim 16, further comprising requesting an update to the loading job upon determining that the loading job is invalid based on said updating.

19. The method of claim 1, wherein the data in the graph database includes:
- values of one or more attributes of one or more vertices associated with the vertex types; and
- values of one or more attributes of one or more edges associated with the edge types.

* * * * *